United States Patent
Wigmore et al.

(10) Patent No.: US 11,151,063 B2
(45) Date of Patent: Oct. 19, 2021

(54) HOST SYSTEM DIRECTLY CONNECTED TO INTERNAL SWITCHING FABRIC OF STORAGE SYSTEM

(71) Applicant: EMC IP Holding Company LLC, Hopkinton, MA (US)

(72) Inventors: Ian Wigmore, Westborough, MA (US); Alesia A. Tringale, Worcester, MA (US); Jason J. Duquette, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/389,383

(22) Filed: Apr. 19, 2019

(65) Prior Publication Data
US 2020/0334177 A1  Oct. 22, 2020

(51) Int. Cl.
*G06F 13/16* (2006.01)
*G06F 13/40* (2006.01)

(52) U.S. Cl.
CPC ...... *G06F 13/1668* (2013.01); *G06F 13/4022* (2013.01)

(58) Field of Classification Search
CPC .................. G06F 13/1668; G06F 13/4022
USPC ..................... 710/1, 5, 22, 52, 308
See application file for complete search history.

(56) References Cited

U.S. PATENT DOCUMENTS

| | | | |
|---|---|---|---|
| 4,476,526 A | 10/1984 | Dodd | |
| 4,916,605 A | 4/1990 | Beardsley | |
| 5,787,304 A * | 7/1998 | Hodges | G06F 13/1642 710/1 |
| 6,311,252 B1 | 10/2001 | Raz | |
| 6,347,358 B1 | 2/2002 | Kuwata | |
| 6,581,112 B1 | 6/2003 | Kallat | |
| 6,604,176 B1 | 8/2003 | MacLellan | |
| 6,609,164 B1 * | 8/2003 | Kallat | G06F 13/28 710/22 |
| 6,611,879 B1 | 8/2003 | Dobecki | |
| 6,636,933 B1 | 10/2003 | MacLellan | |
| 6,651,130 B1 | 11/2003 | Thibault | |

(Continued)

OTHER PUBLICATIONS

'File-Level, Host-Side Flash Caching with Loris' by Appuswamy et al., 2013 International Conference on Parallel and Distributed Systems. (Year: 2013).

(Continued)

*Primary Examiner* — Idriss N Alrobaye
*Assistant Examiner* — Henry W Yu
(74) *Attorney, Agent, or Firm* — Muirhead and Saturnelli, LLC

(57) ABSTRACT

A host system is connected to the internal fabric of a storage system without an intervening external network or director or other component of the storage system controlling the host system's access to the internal fabric. The host system may exchange I/O communications with physical storage devices and/or global memory over an I/O path that does not include any directors, for example, over the internal fabric to which the host system is directly attached. In embodiments in which at least a portion of the global memory is considered part of a director, the host system may be configured to communicate with such global memory over the internal fabric and without use of director compute resources.

14 Claims, 10 Drawing Sheets

(56) References Cited

U.S. PATENT DOCUMENTS

| | | | |
|---|---|---|---|
| 6,651,131 B1* | 11/2003 | Chong, Jr. | G06F 3/061 |
| | | | 709/220 |
| 6,684,268 B1 | 1/2004 | Paluzzi | |
| 6,687,797 B1 | 2/2004 | Walton | |
| 6,742,017 B1 | 5/2004 | Black | |
| 6,779,071 B1 | 8/2004 | Kallat | |
| 6,816,916 B1 | 11/2004 | Black | |
| 6,845,426 B2 | 1/2005 | Kuwata | |
| 6,868,479 B1 | 3/2005 | Thibault | |
| 6,889,301 B1 | 5/2005 | Wilson | |
| 6,901,468 B1 | 5/2005 | Paluzzi | |
| 6,950,914 B2* | 9/2005 | Iwami | G06F 3/0611 |
| | | | 709/214 |
| 6,993,621 B1 | 1/2006 | Black | |
| 7,003,601 B1 | 2/2006 | MacArthur | |
| 7,007,194 B1 | 2/2006 | Wilson | |
| 7,010,575 B1 | 3/2006 | MacArthur | |
| 7,032,068 B2 | 4/2006 | Kuwata | |
| 7,062,620 B1 | 6/2006 | Bisbee | |
| 7,073,020 B1 | 7/2006 | Black | |
| 7,080,190 B2* | 7/2006 | Weber | H04L 49/35 |
| | | | 710/105 |
| 7,117,275 B1 | 10/2006 | Ofek | |
| 7,117,305 B1 | 10/2006 | Chilton | |
| 7,124,245 B1 | 10/2006 | Walton | |
| 7,143,306 B2 | 11/2006 | Porat | |
| 7,181,578 B1* | 2/2007 | Guha | G06F 3/0607 |
| | | | 711/154 |
| 7,185,143 B2* | 2/2007 | Tanaka | G06F 3/0614 |
| | | | 365/230.03 |
| 7,484,049 B1 | 1/2009 | Kinne | |
| 7,620,774 B1* | 11/2009 | Waxman | G06F 9/5055 |
| | | | 709/218 |
| 7,716,434 B2* | 5/2010 | Fujibayashi | G06F 3/0665 |
| | | | 711/162 |
| 7,849,265 B2* | 12/2010 | Hara | G06F 3/061 |
| | | | 710/31 |
| 7,925,829 B1 | 4/2011 | Michael | |
| 7,945,758 B1 | 5/2011 | Michael | |
| 7,970,992 B1 | 6/2011 | Michael | |
| 8,019,901 B2* | 9/2011 | Starr | H04L 29/06 |
| | | | 709/250 |
| 9,612,758 B1 | 4/2017 | Liu | |
| 10,079,889 B1 | 9/2018 | Malwankar | |
| 10,311,008 B2 | 6/2019 | Worley | |
| 10,372,345 B1 | 8/2019 | LeCrone | |
| 2002/0083270 A1 | 6/2002 | Chilton | |
| 2002/0131310 A1 | 9/2002 | Kuwata | |
| 2003/0149839 A1 | 8/2003 | Kuwata | |
| 2004/0081187 A1 | 4/2004 | Warren et al. | |
| 2004/0117596 A1 | 6/2004 | Henry | |
| 2004/0193973 A1 | 9/2004 | Porat | |
| 2005/0071424 A1 | 3/2005 | Baxter | |
| 2006/0206663 A1 | 9/2006 | Kuwata | |
| 2011/0082951 A1* | 4/2011 | Hardy | G06F 11/201 |
| | | | 710/38 |
| 2012/0255000 A1 | 10/2012 | Sallam | |
| 2013/0073895 A1 | 3/2013 | Cohen | |
| 2013/0297894 A1 | 11/2013 | Cohen et al. | |
| 2013/0332700 A1 | 12/2013 | Kopylovitz | |
| 2014/0025947 A1* | 1/2014 | Jaber | G06F 21/6218 |
| | | | 713/164 |
| 2015/0006949 A1* | 1/2015 | Bitties | G06F 11/2007 |
| | | | 714/4.11 |
| 2015/0220481 A1 | 8/2015 | Tanimoto | |
| 2015/0301934 A1* | 10/2015 | Baderdinni | G06F 3/0631 |
| | | | 711/103 |
| 2015/0347314 A1 | 12/2015 | Lee | |
| 2016/0246726 A1 | 8/2016 | Hahn | |
| 2016/0350260 A1 | 12/2016 | Tsirkin | |
| 2016/0350261 A1 | 12/2016 | Tsirkin | |
| 2017/0249162 A1 | 8/2017 | Tsirkin | |
| 2018/0046594 A1 | 2/2018 | Worley | |
| 2018/0081821 A1 | 3/2018 | Beaverson | |
| 2019/0104029 A1 | 4/2019 | Guim Bernat | |
| 2019/0258586 A1 | 8/2019 | Beaverson | |
| 2019/0303310 A1 | 10/2019 | Richter et al. | |

OTHER PUBLICATIONS

'NVMe-over-Fabrics Performance Characterization and the Path to Low-Overhead Flash Disaggregation' by Guz et al., 10th ACM International Systems and Storage Conference (SYSTOR'17), May 2017. (Year: 2017).

'Design and Implementation of Virtual Memory-Mapped Communication on Myrinet' by Dubnicki et al., copyright 1997, IEEE. (Year: 1997).

\* cited by examiner

HOST SYSTEM DIRECTLY CONNECTED TO INTERNAL SWITCHING FABRIC OF STORAGE SYSTEM

BACKGROUND

Technical Field

This application generally relates to data storage and, in particular, providing connectivity, and processing I/O operations, between a host system and a storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In one embodiment of the invention, a storage network is provided including a storage system that includes a plurality of physical storage devices on which data is stored, one or more directors that process I/O operations for the data stored on the plurality of physical storage devices, each of the one or more directors including one or more processing cores, and an internal switching fabric, internal to the storage system, that interconnects the one or more directors. The storage network also includes a host system having one or more applications running thereon, the execution of which results in I/O operations involving the data stored on the plurality of physical storage device, where the host system is connected to the internal switching fabric without any of the one or more directors being connected between the host system and the internal switching fabric. The storage system may include memory used by the one or more directors to process I/O operations, where the host system is communicatively coupled to access the memory using the internal switching fabric independent of any processing core of the one or more directors. The memory may include a cache for processing I/O operations, where the host system is communicatively coupled to the cache by the internal switching fabric. The one or more physical storage devices may be communicatively coupled to the switch fabric along at least one communication path that does not include any of the one or more directors. The host system may be communicatively coupled to the one or more physical storage devices along a communication path that includes the internal switching fabric and that does not include any of the one or more directors. The storage system may include an interface component coupled between the internal switching fabric and the plurality of physical storage devices. The host system may include one or more data structures containing metadata for data stored on the storage system, the metadata including information indicating whether first data is currently stored in cache on the storage system, and I/O logic to determine by accessing the one or more data structures whether to access the first data from the cache or from one or more of the plurality of storage devices.

In another embodiment, for a system including a host system having one or more applications running thereon and a storage system, the storage having a plurality of physical storage devices on which data is stored, one or more directors that process I/O operations involving the data stored on the plurality of physical storage devices, each of the one or more directors including one or more processing cores, and an internal switching fabric, internal to the storage system, that interconnects the one or more directors, a method includes receiving on the host system an I/O request from a first of the one or more applications running thereon, the I/O request specifying a portion of data corresponding to a first of the plurality of physical storage devices, and processing the I/O request, including the host system initiating an I/O communication from the host system to the internal switching fabric without using any of one or more directors. The storage system may include memory used by the one or more directors to process I/O operations, and the method may include the host system communicating with the memory using the internal switching fabric independent of any processing core of the one or more directors. The memory may include a cache for processing I/O operations, and the method may include the host system using the internal switching fabric to communicate with the cache. The method may further include the host system communicating with the one or more physical storage devices along a communication path that includes the internal switching fabric and that does not include any of the one or more directors. The communication path may include an interface component of the storage system, the interface component coupled between the internal switching fabric and the plurality of physical storage devices. The host system may further include one or more data structures containing metadata for data stored on the storage system, the metadata including information indicating whether first data is currently stored in cache on the storage system, and the method may further include the host system accessing the one or more data structures to determine whether to access the first data from the cache or from one or more of the plurality of storage devices.

In another embodiment, for a system including a host system having one or more applications running thereon and a storage system, the storage having a plurality of physical storage devices on which data is stored, one or more directors that process I/O operations involving the data stored on the plurality of physical storage devices, each of the one or more directors including one or more processing cores, and an internal switching fabric, internal to the storage system, that interconnects the one or more directors, one or more non-transitory computer-readable media is provided. The computer-readable media has software stored thereon including executable code that receives on the host system an I/O request from a first of the one or more applications running thereon, the I/O request specifying a portion of data corresponding to a first of the plurality of physical storage devices, executable code that processes the I/O request, including the host system initiating an I/O communication from the host system to the internal switching fabric without using any of one or more directors. The storage system may include memory used by the one or more directors to process I/O operations, and the software may include executable code that controls the host system to communicate with the memory using the internal switching fabric independent of any processing core of the one or more directors. The memory may include a cache for processing I/O operations, and the software may include executable code that controls the host system to use the internal switching fabric to communicate with the cache. The one or more physical storage devices may be communicatively coupled to the switch fabric along at least one communication path that does not include any of the one or more directors. The software may include executable code that controls the host system to communicate with the one or more physical storage devices along a communication path that includes the internal switching fabric and that does not include any of the one or more directors. The communication path may include an interface component of the storage system, the interface component coupled between the internal switching fabric and the plurality of physical storage devices. The host system may further include one or more data structures containing metadata for data stored on the storage system, the metadata including information indicating whether first data is currently stored in cache on the storage system, and the software may include executable code that controls the host system to access the one or more data structures to determine whether to access the first data from the cache or from one or more of the plurality of storage devices.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Figure 1:
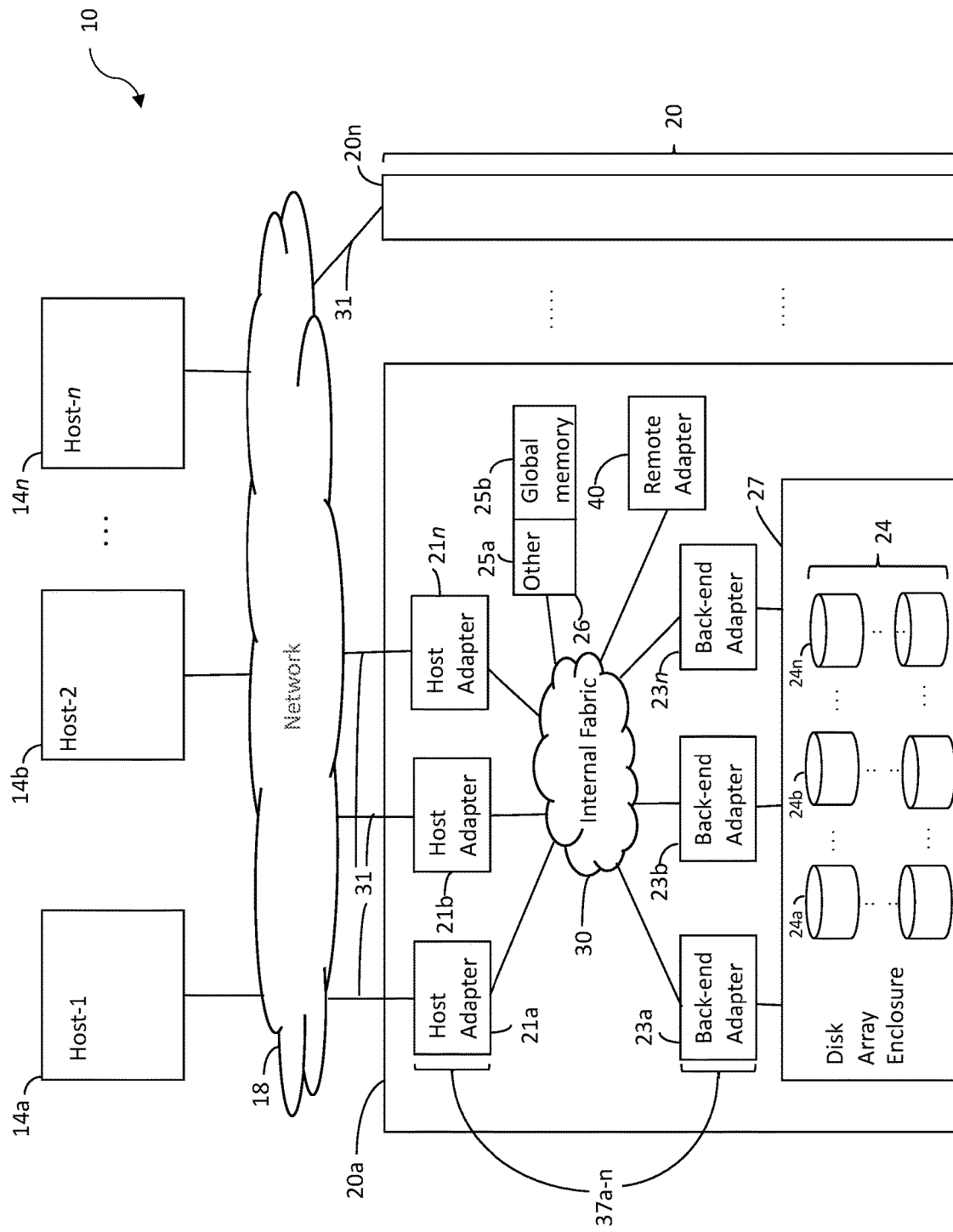
FIG. 1 is a block diagram illustrating an example of a data storage network.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications between one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and global memory 25b of memory 26. The FA may be a Fibre Channel (FC) adapter if FC is the technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems, such as between two of the same or different types of storage systems, and/or may be implemented using a director.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, a sending one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z which is considered to have high throughput and low latency. Other technologies may be used in addition, or as an alternative, to IB for internal communications within the system 20a.

The global memory portion 25b may be used to facilitate data transfers and other communications between the directors 37a-n in a storage system. In one embodiment, the directors 37a-n (e.g., serving as FAs or BEs) may perform data operations using a cache that may be included in the global memory 25b, for example, in communications with other directors, and other components of the system 20a. The other portion 25a is that portion of memory that may be used in connection with other designations that may vary in accordance with each embodiment. Global memory 25b and cache are described in more detail elsewhere herein. It should be appreciated that, although memory 26 is illustrated in FIG. 1 as being a single, discrete component of storage system 20a, the invention is not so limited. In some embodiments, memory 26, or the global memory 25b or other memory 25a thereof, may be distributed among a plurality of circuit boards (i.e., "boards"), as described in more detail elsewhere herein.

In at least one embodiment, write data received at the storage system from a host or other client may be initially written to cache memory (e.g., such as may be included in the component designated as 25b) and marked as write pending. For example, a cache may be partitioned into one or more portions called cache slots, which may be a of a predefined uniform size, for example 128 Kbytes. Write data of a write operation received at the storage system may be initially written (i.e., staged) in one or more of these cache slots and marked as write pending. Once written to cache, the host may be notified that the write operation has completed. At a later time, the write data may be de-staged from cache to the physical storage device, such as by a BE.

It should be generally noted that the elements 24a-n denoting physical storage devices may be any suitable physical storage device such as, for example, a rotating disk drive, SSD (e.g., flash) drive, or other type of storage, and the particular type of physical storage device described in relation to any embodiment herein should not be construed as a limitation.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Any of storage systems 20a-n, or one or more components thereof, described in relation to FIGS. 1-2 may be implemented using one or more Symmetrix®, VMAX®, VMAX3® or PowerMax™ systems (hereinafter referred to generally as PowerMax storage systems) made available from Dell EMC.

Figure 2:
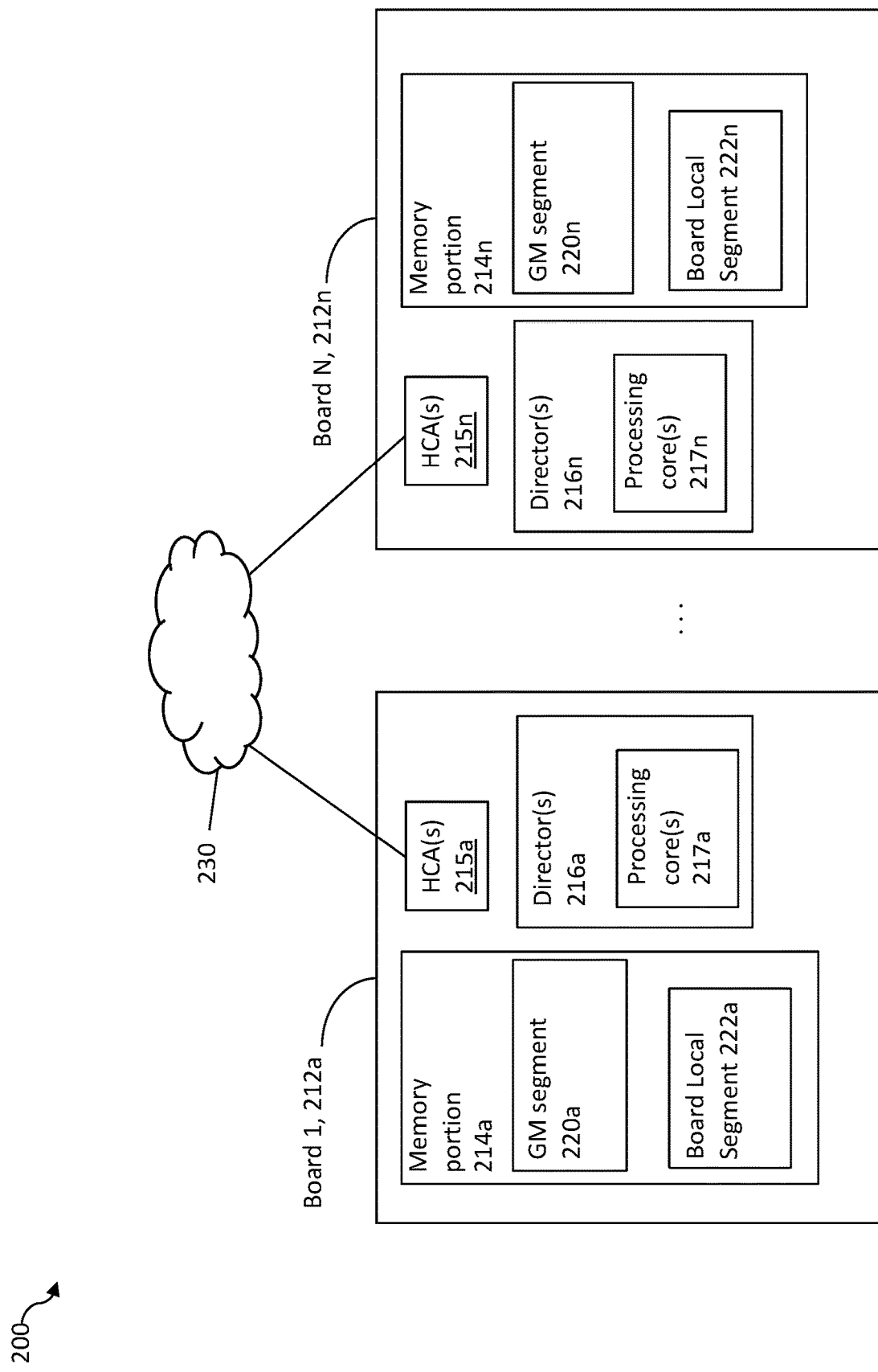
FIG. 2 is a block diagram illustrating an example of a storage system including multiple circuit boards.

FIG. 2 is a block diagram illustrating an example of at least a portion 200 of a storage system (e.g., 20a) including multiple boards 212a-212n. Storage system 200 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-220n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the global memory. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212*a*. For example, board local segment 222*a* may include data described in following paragraphs which is used and accessed only by directors 216*a* included on the same board 212*a* as the board local segment 222*a*. In at least one embodiment in accordance with techniques herein and as described elsewhere herein, each of the board local segments 222*a-n* may include a local page table or page directory used, respectively, by only director(s) 216*a-n* local to each of the boards 212*a-n*.

In such an embodiment as in FIG. 2, the GM segments 220*a-n* may be logically concatenated or viewed in the aggregate as forming one contiguous GM logical address space of a distributed GM. In at least one embodiment, the distributed GM formed by GM segments 220*a*-220*n* may include the data cache, various metadata (MD) and/or structures, and other information, as described in more detail elsewhere herein. Consistent with discussion herein, the data cache, having cache slots allocated from GM segments 220*a-n*, may be used to store I/O data (e.g., for servicing read and write operations).

Returning to FIG. 1, host systems may provide data and access control information through channels to the storage systems, and the storage systems also may provide data to the host systems through the channels. In the embodiment of FIG. 1, the host systems do not address the physical storage devices (e.g., disk drives or flash drives) of the storage systems directly, but rather access to data may be provided to one or more host systems from what the host systems view as a plurality of logical storage devices (e.g., logical storage devices). The logical storage devices may or may not correspond to the actual physical storage devices. For example, one or more logical storage devices may map to a single physical storage device; that is, the logical address space of the one or more logical storage device may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on logical storage device(s) mapped thereto. The unqualified term "storage device" as used herein means a logical device or physical storage device.

In an embodiment in accordance with techniques herein, the storage system as described may be characterized as having one or more logical mapping layers in which a logical device of the storage system is exposed to the host whereby the logical device is mapped by such mapping layers of the storage system to one or more physical devices. Additionally, the host also may have one or more additional mapping layers so that, for example, a host-side logical device or volume may be mapped to one or more storage system logical devices as presented to the host.

Any of a variety of data structures may be used to process I/O on storage system 20*a*, including data structures to manage the mapping of logical storage devices and locations thereon to physical storage devices and locations thereon. Such data structures may be stored in any of memory 26, including global memory 25*b* and memory 25*a*, GM segment 220*a-n* and/or board local segments 22*a-n*. Thus, storage system 20*a*, and storage system 620*a* described in more detail elsewhere herein, may include memory elements (e.g. cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
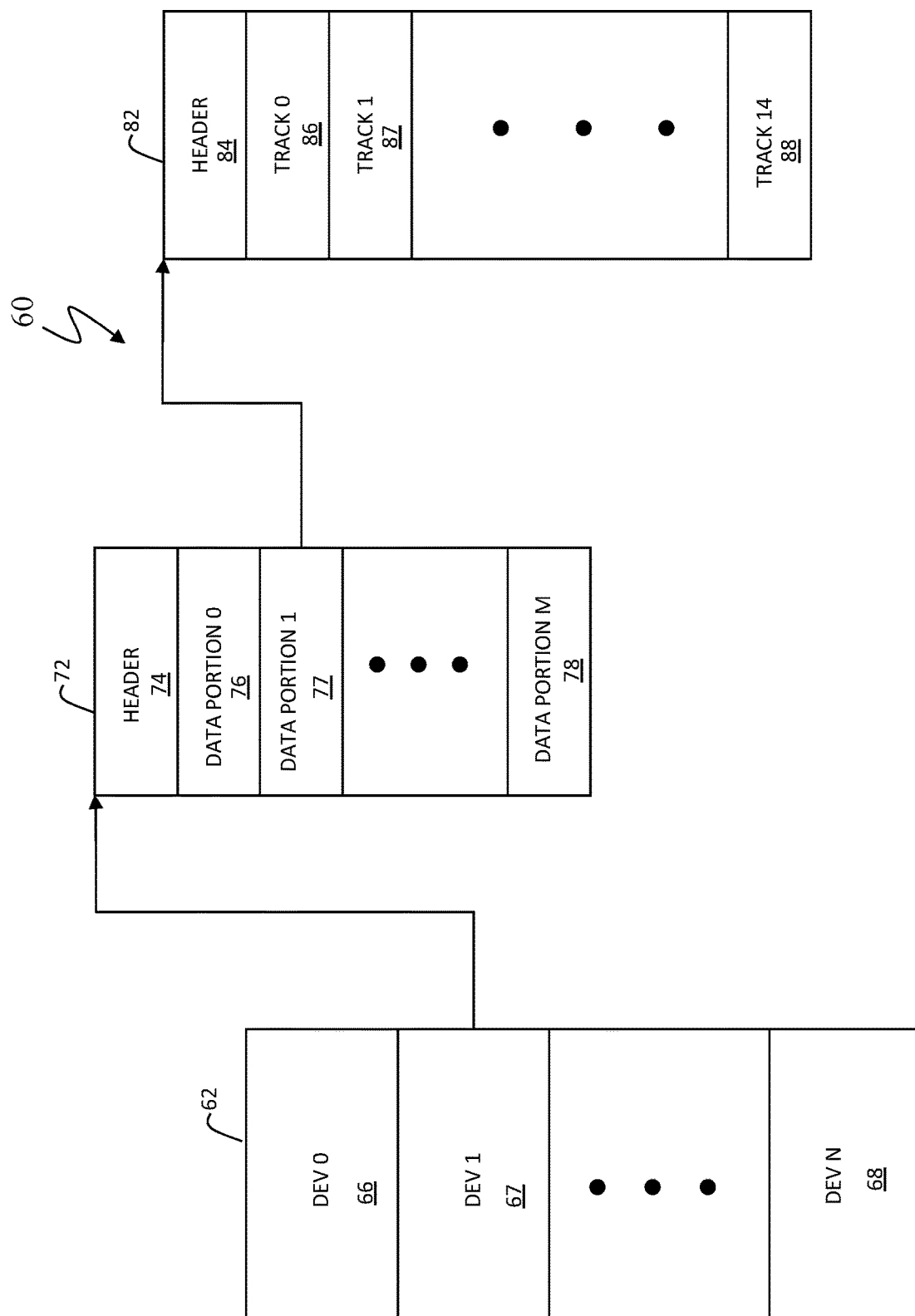
FIG. 3 is a block diagram illustrating an example of tables for keeping track of logical information associated with storage devices.

FIG. 3 is a block diagram illustrating an example of tables 60 for keeping track of logical information associated with storage devices, according to embodiments of the invention. A first table 62 corresponds to the logical devices used by a storage system (e.g., storage system 20*a*) or by an element of a storage system, such as an FA and/or a BE, and may be referred to herein as a "master device table." The master device table 62 may include a plurality of logical device entries 66-68 that correspond to the logical devices used by the storage system. The entries in the master device table 62 may include descriptions for standard logical devices, virtual devices, log devices, thin devices, and other types of logical devices.

Each of the entries 66-68 of the master device table 62 may correspond to another table that contains information for each of the logical devices. For example, the entry 67 may correspond to a table 72, referred to herein a "logical device table." The logical device table 72 may include a header that contains information pertinent to the logical device as a whole. The logical device table 72 also may include entries 76-78 for separate contiguous data portions of the logical device; each such data portion corresponding to a contiguous physical location of a physical storage device (e.g., a cylinder and/or a group of tracks). In an embodiment disclosed herein, a logical device may contain any number of data portions depending upon how the logical device is initialized. However, in other embodiments, a logical device may contain a fixed number of data portions.

Each of the data portion entries 76-78 may correspond to a track table. For example, the entry 77 may correspond to a track table 82 that includes a header 84. The track table 82 also includes entries 86-88, each entry representing a logical device track of the entry 77. In an embodiment disclosed herein, there are fifteen tracks for every contiguous data portion. However, for other embodiments, it may be possible to have different numbers of tracks for each of the data portions or even a variable number of tracks for each data portion. The information in each of the logical device track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the logical device track entries 86-88 may include a pointer (either direct or indirect—e.g., through another data structure) to one or more cache slots of a cache in global memory if the data of the logical track is currently in cache. For example, a logical track entry 86-88 may point to one or more entries of cache slot table 500, described in more detail elsewhere herein. Thus, the track table 82 may be used to map logical addresses of a logical storage device corresponding to the tables 62, 72, 82 to physical addresses within physical storage devices of a storage system and/or to cache slots within a cache.

Figures 4, 5:
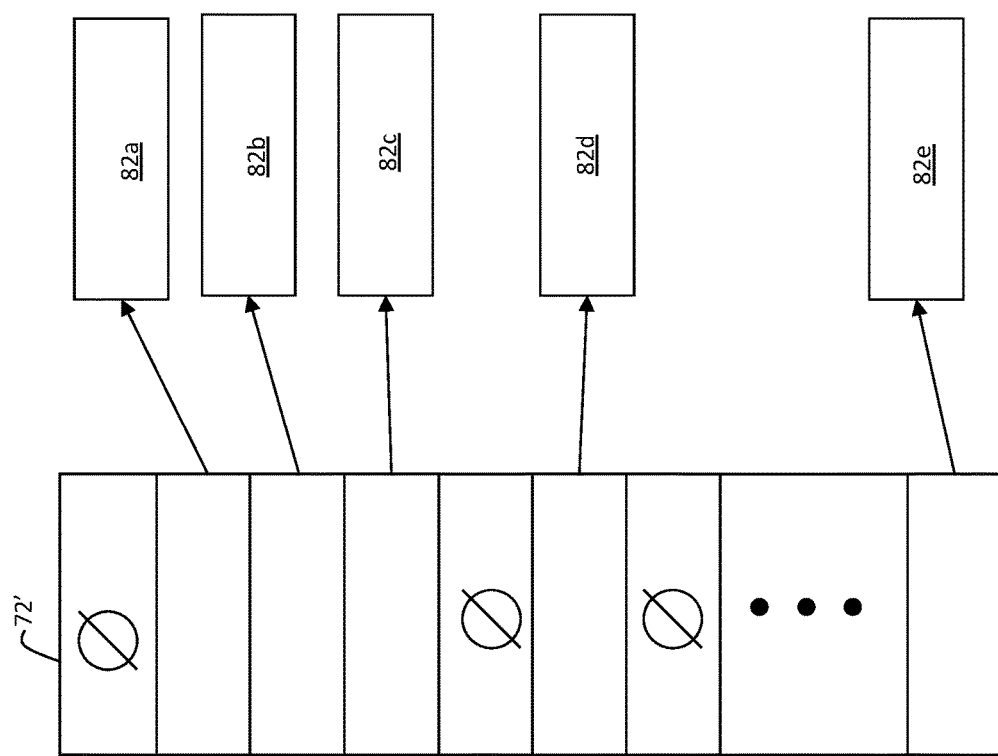
FIG. 4 is a block diagram illustrating an example of a table used for a thin logical device.
FIG. 5 is a block diagram illustrating an example of a data structure for mapping logical device tracks to cache slots.

FIG. 4 is a diagram illustrating an example of a table 72' used for a thin logical device, which may include null pointers as well as entries similar to entries for the table 72, discussed above, that point to a plurality of track tables 82*a*-82*e*. Table 72' may be referred to herein as a "thin device table." A thin logical device may be allocated by the system to show a particular storage capacity while having a smaller amount of physical storage that is actually allocated.

When a thin logical device is initialized, all (or at least most) of the entries in the thin device table 72' may be set to null. Physical data may be allocated for particular sections as data is written to the particular data portion. If no data is written to a data portion, the corresponding entry in the thin device table 72' for the data portion maintains the null pointer that was written at initialization.

The tables 62, 72, 72' 82 of FIGS. 3 and 4 may be stored in the global memory 26 of the storage system 20a during operation thereof and may otherwise be stored in non-volatile memory (i.e., with the corresponding physical device). In addition, tables corresponding to logical devices accessed by a particular host may be stored in local memory of the corresponding one of the FAs 21a-n. In addition, RA 40 and/or the BEs 23a-n may also use and locally store portions of the tables 62, 72, 72' and 82.

Other data structures may be stored in any of global memory 25b, memory 25a, GM segment 220a-n and/or board local segments 22a-n, for example, data structures that map portions (e.g., tracks) of logical storage devices to cache slots in a cache, for example, a cache stored in any of global memory 25b, memory 25a, GM segment 220a-n and/or board local segments 222a-n.

FIG. 5 is a block diagram illustrating an example of a data structure 500 for mapping logical device tracks (e.g., thin device tracks) to cache slots of a cache. Data structure 500 may be referred to herein as a "cache slot table." Cache slot table 500 may include a plurality of entries (i.e., rows) 502, each row representing a logical device track (e.g., any of logical device tracks 86-88 in track table 82) identified by a logical device ID in column 504 and a logical device track ID (e.g., number) identified in column 506. For each entry of cache slot table 500, column 512 may specify a cache location in a cache corresponding to the logical storage device track specified by columns 504 and 506. A combination of a logical device identifier and logical device track identifier may be used to determine from columns 504 and 506 whether the data of the identified logical device track currently resides in any cache slot identified in column 512. Through use of information from any of tables 62, 72, 72' and 82 described in more detail elsewhere herein, the one or more logical device tracks of a logical device specified in an I/O operation can be mapped to one or more cache slots. Further, using the same data structures, the one or more physical address ranges corresponding to the one or more logical device tracks of the logical device may be mapped to one or more cache slots.

On storage network 10, I/O operations (read or write) for data stored on storage system require use of external network 18 and one more directors 37a-n. Thus, I/O performance (e.g., response time) is dependent on the performance of the external network and the one or more directors, which may be serving many host systems, and many applications on each host system, each host system and/or application having its own performance objective.

As described above, a storage system may perform I/O processing, including providing a plurality of data services, that involve use of directors and metadata stored on the storage system, including data structures for mapping logical storage devices and logical locations therein to physical storage devices and physical locations therein. This I/O processing consume storage compute resources (e.g. directors 37a-n) on the storage system, and host systems rely on the storage systems to perform the data services. To upgrade, improve or increase the storage computing power of a storage network, the hardware, software or firmware of one or more storage systems (e.g., of the directors 37a-n) may be upgraded or replaced, or one or more storage systems added to the storage network.

As described above, host systems may have applications running thereon that result in I/O operations with storage systems. However, the host systems may have applications running thereon that do not result in I/O operations, and may perform many other functions and tasks that do not involve I/O operations with storage systems. These other applications, functions and tasks compete for host system resources, including operating system resources, with the application that generate I/O operations with storage systems. Such competition may impact performance of I/O operations, making I/O performance less deterministic than it otherwise would be with dedicated I/O processing resources.

As described above, a host system may be connected to a storage system by an external network. Many entities, including potential attackers, may have access to the external network, via a host system, switch or other means, and have the ability to transmit communications to the storage system; i.e., to access an FA of a storage system and potentially other resources of the storage system, including the data stored thereof.

What is desired is a storage network for which I/O performance for an application running on a host, particularly for read operations, is not dependent on the performance of an external network or a director within a storage system.

What also is desired is the ability to perform at least some data services externally from the storage system, to reduce consumption of compute resources on the storage system.

What also is desired is the ability to increase storage computing power to perform I/O processing on a storage network without having to upgrade or replace storage compute resources (e.g., directors) on one or more storage systems, or add one or more storage systems to the storage network.

What also is desired is the ability to have compute resources on a host system that are dedicated to I/O processing, for better and more deterministic I/O performance.

What also is desired is more secure access to storage system resources.

In some embodiments of the invention, a host system is directly connected to an internal fabric of a storage system; i.e., the host is connected to the internal fabric without an intervening director (e.g., FA) or other component of the storage system controlling the host system's access to the internal fabric. For example, rather than a host system (e.g., host 14a) being physically coupled to a network (e.g., network 18), which is coupled to an FA (e.g., host adapter 21a), which is coupled to an internal fabric (e.g., internal fabric 30) of a storage system (e.g., storage system 20a), where the FA controls the host system's access to other components (e.g., global memory 25b, other directors 37a-n) of the storage system over the internal fabric as illustrated in FIG. 1, the host system may be directly connected to the internal fabric, and communicate with other components of the storage system over the internal fabric independently of any FA or external network. In some embodiments, the host system may communicate with physical storage devices and/or global memory over an I/O path that does not include any directors (e.g., FAs or BEs), for example, over the internal fabric to which the host system is directly attached. In embodiments in which at least a portion of the global memory is considered part of a director, the host system may be configured to communicate with such global memory directly; i.e., over the internal fabric and without use of director compute resources (e.g., a CPU core and/or CPU complex).

In some embodiments, the global memory may include persistent memory for which data stored thereon (including state information) persists (i.e., remains available) after the process or program that created the data terminates, perhaps even after the storage system fails (for at least some period of time). In some embodiments, the internal fabric exhibits low latency (e.g., when IB is employed). In such embodiments, by enabling a host system to directly access global memory of the storage system, which may include persistent memory, host systems may be configured to expand their memory capacity, including persistent memory capacity by using the memory of the storage system. Thus, a system administrator could expand the memory capacity, including persistent memory capacity of the hosts of a storage network without having to purchase, deploy and configure new host systems. Rather, the system administrator may configure existing host systems to utilize the global memory of the storage system, and/or purchase, install and configure one or more storage system interfaces (SSIs; described elsewhere herein in more detail) on existing host systems, which may result in significant savings in time and cost. Further, because of the security advantages provided by the SSI described in more detail elsewhere herein, use of the global memory may prove more secure than memory, including persistent memory, added to host systems to expand memory capacity.

In some embodiments, an SSI, located externally to the storage system, may be provided that serves as an interface between the host system and storage system. The SSI may be part of the host system, and in some embodiments may be a separate and discrete component from the remainder of the host system, physically connected to the remainder of the host system by one or more buses that connect peripheral devices to the remainder of the host system. The SSI may be physically connected directly to the internal fabric. In some embodiments, the SSI may be implemented on a card or chipset physically connected to the remainder of a host system by a PCIe interconnect.

A potential benefit of implementing an SSI as a physically separate and discrete component from the remainder of a host system is that the SSI's resources may be configured such that its resources are not available for any functions, tasks, processing or the like on the host system other than for authorized I/O processing. Thus, I/O performance may be improved and more deterministic, as SSI resources may not be depleted for non-I/O-related tasks on the host system. Further, as a physically separate and discrete component from the remainder of the host system, the SSI 716 may not be subject to the same faults as the remainder of the system, i.e., it may be in a different fault zone from the remainder of the host system.

The SSI may provide functionality traditionally provided on storage systems, enabling at least some I/O processing to be offloaded from storage systems to SSIs, for example, on host systems. Metadata about the data stored on the storage system may be stored on the SSI, including metadata about the data stored in a cache of the storage system, and metadata mapping logical storage devices and logical addresses therein to physical storage devices and physical devices therein ("device-mapping metadata"). The SSI may be configured to determine whether an I/O operation is a read or write operation, and process the I/O operation accordingly. If the I/O operation is a read operation, the SSI may be configured to determine from metadata stored thereon whether the data to be read is in cache on the storage system. If the data is in cache, the SSI may read the data directly from cache over the internal fabric without use of CPU resources of a director, and, in some embodiments, without use of a director at all. If the data is not in cache, the SSI may determine, from the device-mapping metadata, the physical storage device and physical location (e.g., address range) therein of the data to be read. The data then may be read from the physical storage device over the internal fabric without use of a director. Data may be read from a cache or physical storage device to the SSI using RDMA communications that do not involve use of any CPU resources on the storage system, SSI or the host system (e.g., other parts thereof), thereby preserving CPU resources on the storage network.

The I/O processing capabilities of an SSI may be used to offload I/O processing from a storage system, thereby reducing consumption of I/O compute resources on the storage system itself. The overall storage compute capacity of a storage network may be increased without having to upgrade or add a storage system.

In some embodiments, an SSI may implement one or more technology specifications and/or protocols, including but not limited to, NVMe, NVMf and IB. For example, SSI may be configured to exchange I/O communications with the remainder of the host system in accordance with NVMe. In embodiments in which an SSI is configured to communicate in accordance with NVMe, as opposed to in accordance with a native platform (including an OS or virtualization platform) of the host system, significant development and quality assurance costs may be realized, as developing or upgrading an SSI for each new or updated native platform may be avoided. Rather, the native platform may conform to NVMe, an industry standard, and support an OS-native inbox NVMe driver.

In some embodiments, secure access to data on a storage system via direct connection to an internal fabric may be provided. An SSI may validate each I/O communication originating on the host system before allowing a corresponding I/O communication to be transmitted on the internal fabric. The validation may include applying predefined rules and/or ensuring that the I/O communication conforms to one or more technologies, e.g., NVMe. Additional security measures may include requiring validation of any SSI software or firmware before loading it onto the SSI, for example, using digital signatures, digital certificates and/or other cryptographic schemes, to ensure unauthorized code is not loaded onto the SSI that could enable unauthorized I/O activity on a storage system. Further, in some embodiments, the SSI may be configured to encrypt I/O communications originating on a host system and to decrypt I/O communications received from the storage system, for example, in embodiments in which data is encrypted in flight between the host system to physical storage devices, and data may be encrypted at rest in memory of the storage system and/or on physical storage devices.

In addition, data integrity (e.g., checksums) in accordance with one or more technologies (e.g., T10DIF) may be employed by the SSI on I/O communications exchanged between host systems and data storage systems, by which end-to-end data integrity between a host system and physical storage devices may be implemented, as described in more detail herein.

In some embodiments, in addition to an SSI communicatively coupled between a host operating system and an internal fabric of a storage system, a storage network may include an interface communicatively coupled between an internal fabric and a DAE that encloses a plurality of physical storage devices; i.e., a fabric-DAE interface ("FDI"). The FDI may be configured to employ any of a plurality of technologies, including NVMe, NVMf and IB, as described in more detail herein. In such embodiments, I/O communications configured in accordance with NVMe may be implemented end-to-end from a host system to physical storage device, as described in more detail herein.

As described in more detail herein, through an SSI, a host system may exchange I/O communications, including control information (e.g., commands) and data, with global memory including cache along an I/O path including internal fabric without use of compute resources of any of directors. Further, through an SSI, a host system may exchange I/O communications, including control information (e.g., commands) and data, with physical storage devices along an I/O path including internal fabric and not including use of directors. Thus, an I/O path in a known storage network, which may include an HBA, an external network, an FA, an internal fabric, a BE, a PCI switch and a physical storage device, may be replaced with an I/O path in accordance with embodiments of the invention, which includes an SSI, an internal fabric, an FDI and a physical storage device. These new I/O paths, eliminating use of external networks and director compute resources (or directors altogether) may produce reduced response times for certain I/O operations, as described in more detail elsewhere herein.

By removing an external network from the I/O path between a host system and a storage system, and routing I/O requests (e.g., all I/O requests on a storage network) through one or more SSIs, the possible sources of malicious actions or human error can be reduced; i.e., the attack surface of a storage system can be reduced. Further, by implementing validation logic as described in more detail herein, in particular as close as possible (logically) to where an SSI interfaces with a remainder of a host system (e.g., as close as possible to physical connections to peripheral device interconnects), for example, within an NVMe controller, the storage system may be made more secure than known storage networks having I/O paths including external networks. To further reduce access to an SSI, an NVMe driver may be configured as the only interface of an SSI made visible and accessible to applications on a host system. Any other interfaces to an SSI, for example, required for administration, may be made accessible only through certain privileged accounts, which may be protected using security credentials (e.g., encryption keys).

It should be appreciated that, although embodiments of the invention described herein are described in connection with use of NVMe, NVMf and IB technologies, the invention is not so limited. Other technologies for exchanging I/O communications, for example, on an internal fabric of a storage system, may be used.

Illustrative embodiments of the invention will now be described in more detail in relation to FIGS. 6-11.

Figure 6:
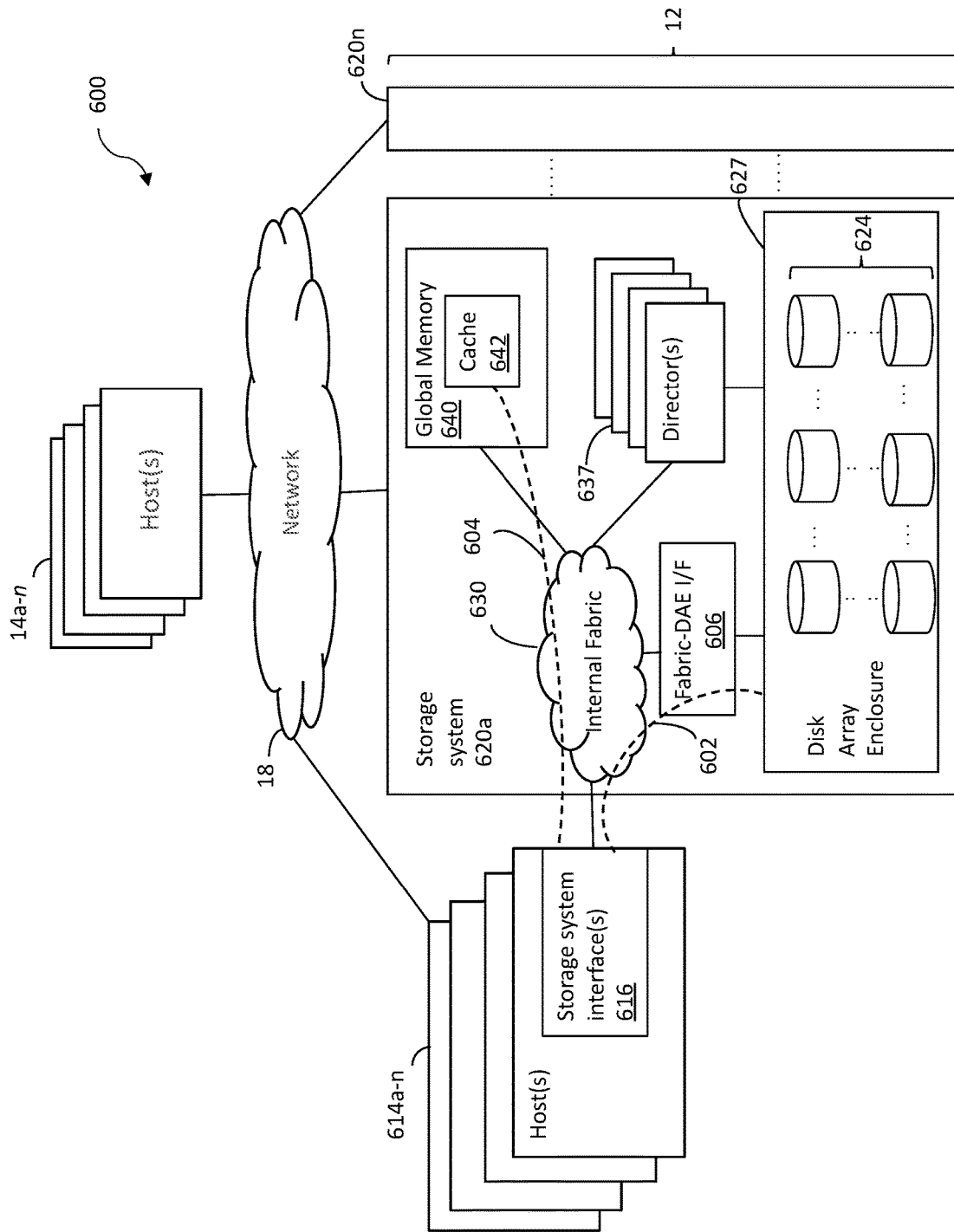
FIG. 6 is a block diagram illustrating an example of a data storage network, including one or more host systems directly connected to internal fabric of a storage system, according to embodiments of the invention.

FIG. 6 is a block diagram illustrating an example of a storage network 600 including one or more host systems 614*a-n* directly connected to an internal fabric 630 of a storage system 620*a*, according to embodiments of the invention. Other embodiments of a storage network including one or more host systems directly connected to an internal fabric of a storage system, for example, variations of system 600, are possible and are intended to fall within the scope of the invention.

Storage network 600 may include any of: one or more host systems 14*a-n* (described in more detail elsewhere herein); network 18 (described in more detail elsewhere herein); one or more host systems 614*a-n*; one or more storage systems 620*a-n*; and other components. Storage system 620*a* may include any of: global memory 640 (e.g., 25*b*); one or more directors 637 (e.g., 37*a-n*); a plurality of physical storage devices 624 (e.g., 24), which may be enclosed in a disk array enclosure 627 (e.g., 27); internal fabric 630 (e.g., internal fabric 30); FDI 606, other components; or any suitable combination of the foregoing. Internal fabric 630 may include one or more switches and may be configured in accordance with one or more technologies, for example, IB. In some embodiments, at least a portion of global memory 640, including at least a portion of cache 642, may reside on one or more circuit boards on which one of the directors 637 also resides, for example, in manner similar to (or the same as) boards 212*a-n* described in relation to FIG. 2. In such embodiments, a director 637 may be considered to include at least a portion of global memory 640, including at least a portion of cache 642 in some embodiments. FDI 606 may be configured to manage the exchange of I/O communications between host system 614*a-n* directly connected to internal fabric 630 and physical storage devices 624 (e.g., within DAE 627), as described in more detail elsewhere herein.

Each of host systems 614*a-n* may include SSI 616 connected directly to internal fabric 630 and configured to communicate with global memory 640 and physical storage devices 624 (e.g., via FDI 606) over the internal fabric 630 independently of any of the directors 637 or any external network, for example, network 18. In embodiments in which one or more directors 637 may be considered to include at least a portion of global memory 640, including at least a portion of cache 642 in some embodiments, SSI 616 may be configured to communicate with such global memory 640, including cache 642, directly without use of any compute resources (e.g., of a CPU core and/or CPU complex) of any director 637. For example, SSI 616 may be configured to use RDMA as described in more detail herein. Thus, embodiments of the invention in which a host system, or more particularly an SSI, communicates directly with a global memory or cache of a storage system include: the host system communicating with a portion of global memory or cache not included in a director independently of any director; and/or the host system communicating with a portion of global memory or cache included in a director independently of any compute resources of any director. In both cases, communicating directly with a global memory or cache of a storage system does not involve use of any compute resources of the director.

The global memory 640 may include persistent memory for which data stored thereon persists after the process or program that created the data terminates. For example, at least portions of global memory may be implemented using DIMM (or another type of fast RAM memory) that is battery-backed by a NAND-type memory (e.g., flash). In some embodiments, the data in such persistent memory may persist (for at least some period of time) after the storage system fails.

As illustrated in FIG. 6, each of host systems 614*a-n* may be connected to any of storage system 620*a-n* through network 18, for example, through an HBA on the host. While not illustrated in FIG. 6, one or more of SSIs 616 may be connected to one or more other storage systems of storage systems 620*a-n*. It should be appreciated that any of hosts 614*a-n* may have both: one or more HBAs for communicating with storage systems 620*a-n* over network 18 (or other networks); and one or more SSIs 616 connected directly to an internal fabric of one or more storage systems 620a-n and configured to communicate with global memory and physical storage devices over the internal fabric independently of any directors or external network.

One or more of the directors 637 may serve as BEs (e.g., BEs 23a-n) and/or FAs (e.g., host adapter 21a-n), and enable I/O communications between the storage system 620a and hosts 14a-n and/or 614a-n over network 18, for example, as described in relation to FIG. 1. Thus, a storage system 620a may concurrently provide host access to physical storage devices 624 through: direct connections to internal fabric 630; and connections via network 18 and one or more directors 637.

Figure 7:
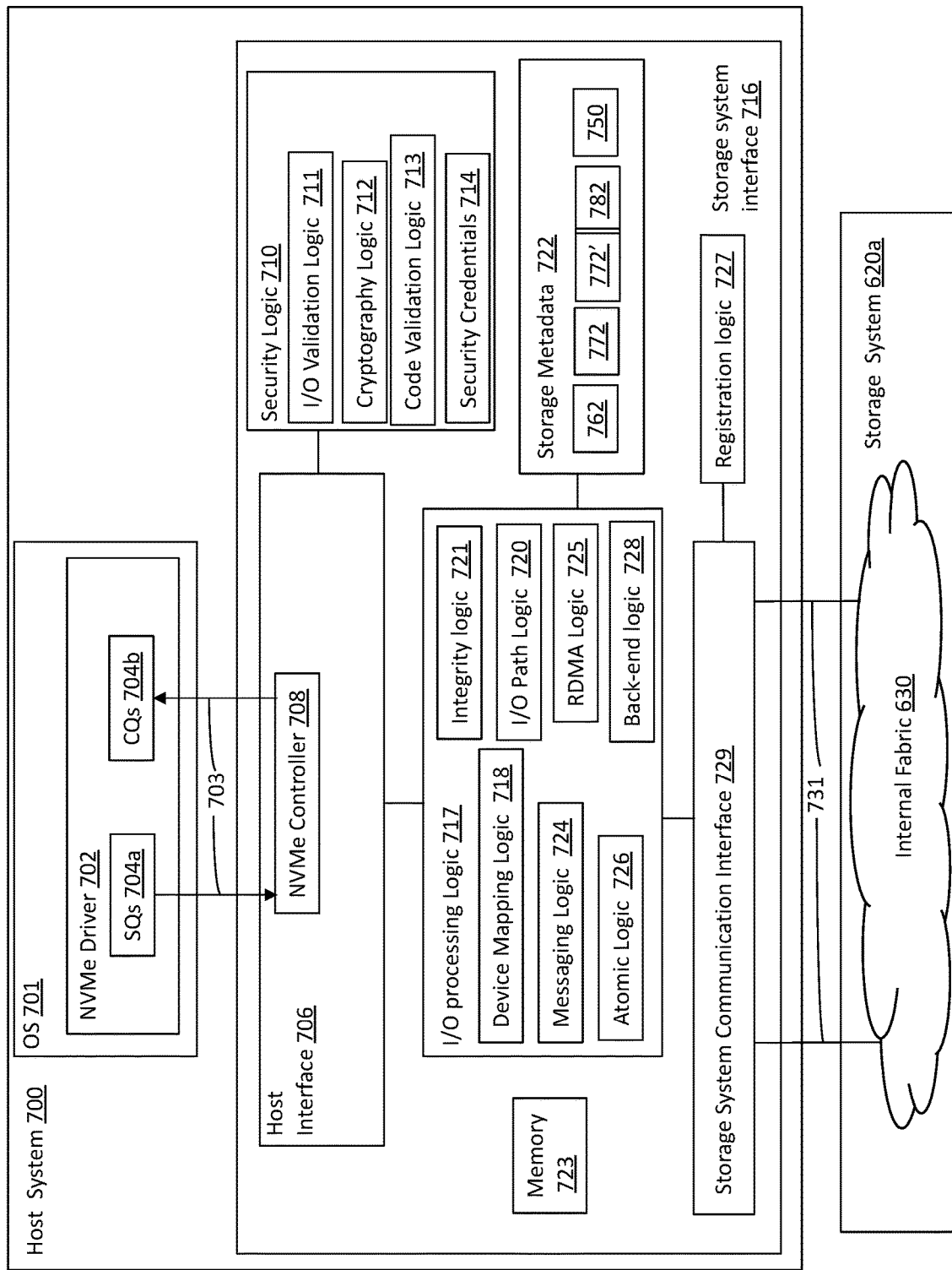
FIG. 7 is a block diagram illustrating an example of a storage system interface of a host system directly connected to internal fabric of a storage system, according to embodiments of the invention.

SSI 616 may be implemented as SSI 716 described in relation to FIG. 7. FIG. 7 is a block diagram illustrating an example of an SSI 716 of a host system 700 directly connected to an internal fabric 630 of a storage system, according to embodiments of the invention. Other embodiments of an SSI of a host system directly connected to an internal fabric of a storage system, for example, variations of SSI 716, are possible and are intended to fall within the scope of the invention.

Host system 700 (e.g., one of host systems 614a-n) may include any of: operating system (OS) 701; an SSI 716 (e.g., SSI 616); one or more peripheral device interconnects 703; other components; and any suitable combination of the foregoing. Host OS 701 may be configured to execute applications running on the host system, which may result in I/O operations for data stored on any of storage systems 620a-n, requiring I/O communications to be exchanged between the host system and the one or more storage systems 620a-n. Host OS 701 may be any suitable operating system for processing I/O operations, for example, a version of Linux, or a hypervisor or kernel of a virtualization platform, for example, a version of VMware ESXi™ software available from VMware, Inc. of Palo Alto, Calif. Other operating systems and virtualization platforms that support an NVMe driver may be used.

In some embodiments, SSI 716 may be physically separate and discrete from the remainder of host system 700, the remainder including the OS 701 of the host system and the hardware and firmware on which the OS 701 executes, and SSI 716 may be pluggable into host system 700, which may be physically configured to receive SSI 716. In such embodiments, the SSI 716 may be considered a first physical part of the host system, for example, a peripheral component or device of the host system, and the remainder of the host system may be considered a second physical part of the host system. For example, SSI 716 may be configured to physically connect to the other part of the host system 700 by the one or more peripheral device interconnects 703, which may be configured in accordance with one or more technologies (e.g., PCIe, GenZ, another interconnect technology, or any suitable combination of the foregoing). An interconnect configured to connect to, and enable communications with, a peripheral component or device may be referred to herein as a "peripheral device interconnect," and a peripheral device interconnect configured in accordance with PCIe referred to herein as a "PCIe interconnect." SSI 716 may be implemented on a card or chipset, for example, in the form of a network interface controller (NIC), which may be configured with additional logic as described herein such that the resulting device may be considered a smart NIC ("SmartNIC"). As is described in more detail herein, SSI 716 may include an operating system for executing one or more I/O-related functions. Thus, in some embodiments, a first one or more operating systems (e.g., host OS 701) may be executing applications (e.g., on first part of the host 700) that result in I/O operations, while SSI 716 includes one or more second operating systems for performing functions and tasks on SSI 716 in relation to processing such I/O operations, such functions and tasks described in more detail elsewhere herein.

In some embodiments, SSI 716 may be configured to communicate according to a PCIe specification over one or more peripheral device interconnects 703, and SSI 716 may be configured to communicate according to an NVMe specification such that the SSI 716 presents itself as one or more NVMe devices (e.g., drives) to the host system 700. For example, the host interface 706 may include an NVMe controller 708 configured to exchange I/O communication according to NVMe with NVMe queues within an NVMe driver 702 of OS 701. That is, the OS 701 of the host system 700 may include an NVMe driver 702 configured to exchange I/O communications with the NVMe controller 708 in accordance with NVMe. To this end, the NVMe driver 702 may include at least two I/O queues, including one or more submission queues (SQs) 704a for submitting commands via a peripheral device interconnect 703 (configured as a PCIe interconnect) to NVMe controller 708, and may one or more completion queues (CQs) 704b for receiving completed commands from NVMe controller 708 via one or more interconnects 703. Each SQ may have a corresponding CQ, and, in some embodiments, multiple SQs may correspond to the same CQ. In some embodiments, there may be up to 64K I/O queues in accordance with a version of the NVMe specification. The NVMe driver 702 also may include one or more admin SQs and CQs for control management in accordance with a version of the NVMe specification, and NVMe driver 702 and NVMe controller 708 may be configured to exchange control management communications with each other using admin SQs and CQs in accordance with a version of the NVMe specification.

SSI 716 may include any of: host interface 706, security logic 710; I/O processing logic 717; storage metadata (MD) 722; storage system communication interface (SSCI) 729; registration logic 727; memory 723; other components; or any suitable combination of the foregoing.

Registration logic 727 may be configured to register host system 700 and/or SSI 716 with storage system 620a when SSI 716 is connected to internal fabric 630, to enable future communication between the storage system 620a and internal fabric 630.

Security logic 710 may include any of: I/O validation logic 711; cryptographic logic 712; code validation logic 713; security credentials 714; other components; or any suitable combination of the foregoing. I/O validation logic 711 may prevent any undesired (e.g., invalid) communications from being further processed by SSI 716 or storage system 620a. Security logic 710, and more specifically I/O validation logic 711, may be a first component of SSI 716 to act on a communication received on one of the peripheral device interconnects 703, to ensure that any undesired communications do not proceed any further within SSI 716 and storage system 620a. To this end, it should be appreciated that one or more aspects of security logic 710, including I/O validation logic 711 and code validation logic 713, or portions thereof, may be implemented as part of host interface 706, for example, as part of NVMe controller 708.

I/O validation logic 711 may include logic that verifies that a communication received on one of peripheral device interconnects 703 is indeed an I/O communication authorized to be transmitted on SSI 716. For example, I/O validation logic 711 may be configured to ensure that a received communication is an I/O communication properly configured in accordance with NVMe, and to reject (e.g., discard or drop) any received communications not properly configured. Further, I/O validation logic 711 may be configured to allow only a certain subset of I/O operations, for example, read or write operations, and reject other I/O operations, for example, operations to configure storage and/or other storage management operations. Such stipulations may be captured as one or more user-defined rules that may be defined and stored (e.g., in a rules data structure) within SSI 716. It should be appreciated that rules may be specific to one or more storage-related entities, for example, users, groups of users, applications, storage devices, groups of storage devices, or other property values. Thus I/O validation logic 711 may be configured to implement any of a variety of business rules to control access to resources on storage system 620a.

Cryptographic logic 712 may be configured to encrypt data included in I/O communications received from host OS 701 and before repackaging the data (in encrypted form) in I/O communications transmitted over internal fabric 630 to components of storage system 620a. Cryptographic logic 712 also may be configured to decrypt data from I/O communications received from internal fabric 620a before sending the unencrypted data in I/O communication to host OS 701. Any of a variety of cryptographic schemes may be used, including use of symmetric and/or asymmetric keys, which may be shared or exchanged between SSI 716 of the host system, one of more storage systems 620a-n, and one or more SSIs of other host systems 614a-n, depending on what entities are entitled access to the data. For example, during a manufacturing and/or configuring of SSIs 716 and/or storage systems 620a-n, one or more encryption keys and/or other secrets (collectively, "security credentials") may be shared, to enable implementation of the given cryptographic scheme, and may be stored as part of security credentials 714.

In embodiments in which data is encrypted on SSI 716 before being transmitted to the storage system 620a, the data may be stored in encrypted form in physical storage devices 624 and/or global memory 640. In such embodiments, directors 637 and other components that may be authorized to access the encrypted data also may be configured to implement whatever cryptographic scheme is being employed, which may be desirable for host systems (e.g., host systems 14a-n) that may access storage system 620a by means other than an SSI as described herein. In some known storage systems, physical storage devices may be self-encrypting drives that encrypt data received from BEs, and then decrypt the data when it is retrieved for BEs. This may be considered a form of data-at-rest encryption. In embodiments of the invention in which data is encrypted on SSI 716, and transmitted to physical storage devices 624 in encrypted form to be stored, it may be desirable that physical storage devices 624 do not employ their own encryption, as the data will arrive encrypted. That is, encrypting the already-encrypted data would be redundant, and a waste of processing resources. Further, self-encrypting drives may be more expensive than drives not including this feature. Thus, if there is no need for physical storage devices 624 to encrypt and decrypt data, physical storage device not having self-encryption, but otherwise having the same or similar capabilities, may be acquired at reduced cost.

By encrypting data on a host system, e.g., as part of an SSI 716, data may not only be able to be encrypted while at rest, but also while in transit. That is, in embodiments of the invention, data may be encrypted in transit on an I/O path from a host system to a physical storage device (i.e., end-to-end) as well as being encrypted at rest on a physical storage device or in memory (e.g., cache) of a storage system.

As described in more detail elsewhere herein, SSI 716 may be implemented in various combinations of hardware, software and firmware, including microcode. In some embodiments of SSI 716 implemented using software and/or firmware, the software and/or firmware, and updates thereto, may be subject to verification of digital signature before being allowed to be installed on SSI 716. For example, the security credentials 714 may include a public certificate that includes a cryptographic key (e.g., a public key of a PKI pair or the like), which may be embedded within the software and/or firmware initially installed on SSI 716 (e.g., at the manufacturer of SSI 716). The public certificate also may specify a validity period for the public certificate. Each subsequent update of the software and/or firmware may be digitally signed with a digital signature based on an encryption scheme (e.g., PKI) involving the public key.

When a purported software and/or firmware update is received at SSI 716 including a digital signature, code validation logic 713 may use the public key (and the validity period) in the public certificate to validate the digital signature and thereby verify the authenticity of the update, for example, by exchanging communications with a certification service or the like of the SSI 716 manufacturer or a trusted third-party, using known techniques. The security credentials 714, including the public certificate and perhaps other credentials, and credentials used for encrypting and decrypting data, may be embedded within the software and/or firmware on the SSI 716 so that they are not accessible by the host system 700 or any other entity connected to the SS1 716. For example, the security credentials 714 may be stored within a trusted platform module (TPM) or the like within SSI 716. If the code validation logic determines the software or firmware update to be invalid, the update may not be installed on SSI 716. Such verification of the software and/or firmware may prevent an attacker from replacing software and/or firmware on SSI 716 with code that would allow access to resources within storage system 620a.

Storage metadata 722 may include any metadata about data stored on storage system 620a, including but not limited to any of the metadata described herein. For example, storage MD 722 may include any of master device table 762, logical device table 772, thin device table 772', track table 782 and cache slot table 750, corresponding to master device table 62, logical device table 72, thin device table 72', track table 82 and cache slot table 500, respectively. For example, each of tables 762, 772, 772', 782 and 750 may include at least a portion of the metadata stored in 762, 772, 772', 782 and 750, respectively; e.g., metadata corresponding to physical storage devices 624, and logical storage devices associated therewith, being used for applications running on host system 700. Use of such metadata is described in more detail elsewhere herein.

I/O processing logic 717 may include one or more components for performing I/O operations in conjunction with storage system 620a. In some embodiments, one or more of these components embody I/O functionality, including data services, that is implemented on known storage systems. By implementing such I/O functionality on SSI 716 instead of on the storage system 620a, less storage system resources may be consumed, and overall I/O performance on the storage system may be improved. I/O processing logic 717 may include any of: device mapping logic 718; I/O path logic 720; messaging logic 724; RDMA logic 725; atomic logic 726; back-end logic 728, integrity logic 721; other components; or any suitable combination of the foregoing.

Device mapping logic 718 may be configured to map logical addresses of logical storage devices to locations (i.e., physical addresses) within physical storage devices using, e.g., any one or more of tables 762, 772, 772' and 782, 750 for example, as described in more detail herein in relation to method 800.

I/O path logic 720 may be configured to determine what I/O path within storage system 620a to use to process an I/O operation. I/O path logic 720 may be configured to determine what path to take for an I/O operation based on any of a variety of factors, including but not limited to whether the I/O is a read or write; how complicated a state of the storage system is at the time the I/O operation is being processed; whether the data specified by the I/O operation is in a cache of the storage system; other factors; or a combination of the foregoing. For example, based on one or more of the foregoing factors, I/O path logic 720 may determine whether to process an I/O request by: sending a communication to a director; directly accessing a cache on the storage system (i.e., without using any compute resources of a director) or accessing a physical storage device without using a director (e.g., via an FDI). I/O path logic 720 may be configured to determine what I/O path within storage system 620a to use to process an I/O operation as described in more detail in relation to method 800.

Integrity logic 721 may be configured to implement one or more data integrity techniques for I/O operations. Some data storage systems may be configured to implement one or more data integrity techniques to ensure the integrity of data stored on the storage system on behalf of one or more host systems. One such data integrity technique is called DIF (data integrity field), or "T10DIF" in reference to the T10 subcommittee of the International Committee for Information Technology Standards that proposed the technique. Some storage systems, for example, in accordance with one or more technology standards, store data arranged as atomic storage units called "disk sectors" having a length of 512 bytes. T10 DIF adds an additional 8 bytes encoding a checksum of the data represented by the remaining 512 byes, resulting in data actually being stored as 520-byte atomic units, including 512 bytes of data and 8 bytes of checksum data in accordance with T10DIF. In embodiments of the invention in which storage system 620a is implementing T10DIF, integrity logic 721 may be configured to implement T10DIF, thereby converting 512-byte units of data in I/O communications received from host OS 701 to 520-byte units of data in accordance with T10DIF to be transmitted in I/O communications to storage system 620a. In such embodiments, integrity logic 721 also may be configured to convert 520-byte units of data in I/O communications received from storage system 620a to 512-byte units of data to be transmitted in I/O communications to host OS 701. In such embodiments, data integrity on a storage network (e.g., storage network 600) may be improved by implementing T10DIF on an I/O path from a host system to a physical storage device (e.g., end-to-end).

As described in more detail in relation to method 800, processing I/O operations in accordance with embodiments of the invention may include exchanging RDMA communications, control (e.g., command) communications and atomic communications between host system 700 and storage system 620a. RDMA logic 725, messaging logic 724, and atomic logic 726, respectively, may be configured to implement such communications. Atomic communications involve performing exclusive locking operations on memory locations (e.g., at which one or more data structures described herein reside) from which data is being accessed, to ensure that no other entity (e.g., a director) can write to the memory location with other data. The exclusive locking operation associated with an atomic operation introduces a certain amount of overhead, which may be undesired in situations in which speed is of greater performance.

It may be desirable for host system 700; e.g., SSI 716, to know information (e.g., a state) of one or more physical storage devices 624, for example, whether a physical storage device is off-line or otherwise unavailable, e.g., because of garbage collection. To this end, in some embodiments, back-end logic 728 may monitor the status of one or more physical storage devices 624, for example, by exchanging communications with FDI 606 over internal fabric 630.

SSCI 729 may include logic for steering and routing I/O communications to one or more ports 731 of SSI 716 physically connected to internal fabric 630, and may include logic implementing lower-level processing (e.g., at the transport, data link and physical layer) of I/O communications, including RDMA, messaging and atomic communications. In some embodiments of the invention, communications between SSI 716 and components of storage system 620a (e.g., directors 637, global memory 640 and FDI 606) over internal fabric 630 may be encapsulated as NVMf command capsules in accordance with an NVMf specification. For example, SSCI 729 may include logic for encapsulating I/O communications, including RDMA, messaging and atomic communications, in accordance with NVMf. Thus, in some embodiments, I/O communications received from NVMe driver 702, configured in accordance with NVMe, may be converted to NVMf command capsule communications for transmission over the internal fabric 630. SSCI 729 also may include logic for de-capsulating NVMf command capsules, for example, into NVMe communications to be processed by I/O processing logic 717.

SSCI 729 (and components of the storage system 620a interfacing with the internal fabric 630) may be configured to address communication to other components; e.g., global memory 640, FDI 606, directors 637, in accordance with one or more technologies being used to communicate over internal fabric 630. For example, in embodiments in which IB is employed to communicate over internal fabric 630, SSCI 729 may be configured to address communication to other components using IB queue pairs. Aspects of SSCI 729 may be implemented using a network adapter (e.g., card or chip), for example, a ConnectX®-5 dual-port network adapter available from Mellanox Technologies, Ltd. of Sunnyvale, Calif. ("Mellanox"), for example, as part of a SmartNIC.

SSI 716 may be implemented as a combination of software, firmware and/or hardware. For example, SSI 716 may include certain hardware and/or firmware, including, for example, any combination of printed circuit board (PCB), FPGA, ASIC, or the like, that are hardwired to perform certain functionality, and may include one or more microprocessors, microcontrollers or the like that are programmable using software and/or firmware (e.g., microcode). Any suitable microprocessor may be used, for example, a microprocessor including a complex instruction set computing (CISC) architecture, e.g., an x86 processor, or processor having a reduced instruction set computing (RISC) architecture, for example, an ARM processor. SSI 716 may include a memory 723, which may be used by one or more of the components of SSI 716, and may be part of a microprocessor or separate therefrom. In embodiments in which a microprocessor is employed, any suitable OS may be used to operate the microprocessor, including, for example, a Linux operating system. In some embodiments, the combination of software, hardware and/or firmware may constitute a system-on-chip (SOC) or system-on-module (SOM) on which SSI 716 may be implemented, e.g., as part of a SmartNIC. For example, in some embodiments, SSI 716 may be implemented, at least in part, using a BlueField™ Multicore System On a Chip (SOC) for NVMe storage, available from Mellanox, which may be further configured with logic and functionality described herein to constitute a SmartNIC.

Returning to FIG. 6, FDI 606 and one or more of physical storage devices 624 may be configured to exchange I/O communications in accordance with NVMe. Accordingly, FDI 606 may include an NVMe controller, e.g., at least similar to the NVMe controller 708, configured to exchange I/O communication according to NVMe with physical storage devices 624. Further, FDI 606 may be configured with the same or similar functionality as SSCI 729. For example, SSCI 729 may include: logic for steering and routing I/O communications to one or more of its ports physically connected to internal fabric 630, logic implementing lower-level processing (e.g., at the transport, data link and physical layer) of I/O communications, including RDMA and messaging communications; logic for encapsulating I/O communications to be sent from FDI 606 over internal fabric 630 to SSI 616, including RDMA and command messaging communications, in accordance with NVMf; logic for de-capsulating NVMf command capsules received from internal fabric 630, the decapsulated communication to be configured in accordance with NVMe for use by an NVMe controller of the FDI 606 for exchanging I/O communications with physical storage devices 624.

FDI 606 may be implemented as a combination of software, firmware and/or hardware including, for example, any combination of printed circuit board (PCB), FPGA, ASIC, or the like, that are hardwired to perform certain functionality, and may include one or more microprocessors, microcontrollers or the like that are programmable using software and/or firmware (e.g., microcode). Any suitable microprocessor may be used, for example, a microprocessor including a complex instruction set computing (CISC) architecture, e.g., an x86 processor, or processor having a reduced instruction set computing (RISC) architecture, for example, an ARM processor. In some embodiments, the combination of software, hardware and/or firmware may constitute a system-on-chip (SOC) or system-on-module (SOM) on which FDI 606 may be implemented. For example, in some embodiments, FDI 606 may be implemented using a Blue-Field™ Multicore SOC for NVMe storage, available from Mellanox.

Figure 8B:
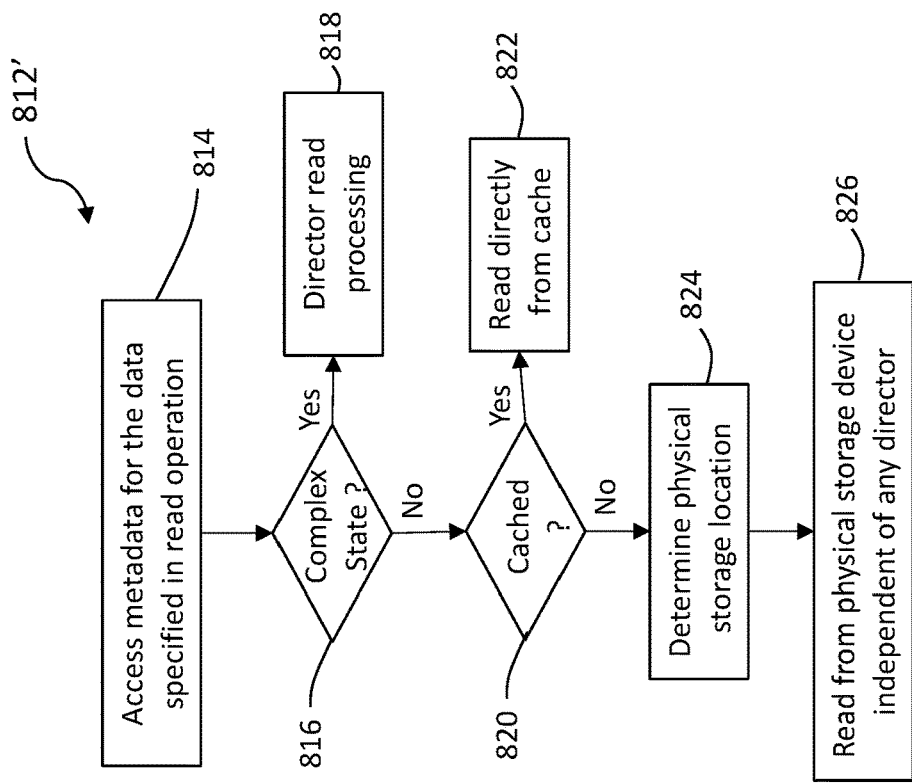
FIG. 8B is a flowchart illustrating an example of a method of processing a read operation, according to embodiments of the invention.
Figure 8A:
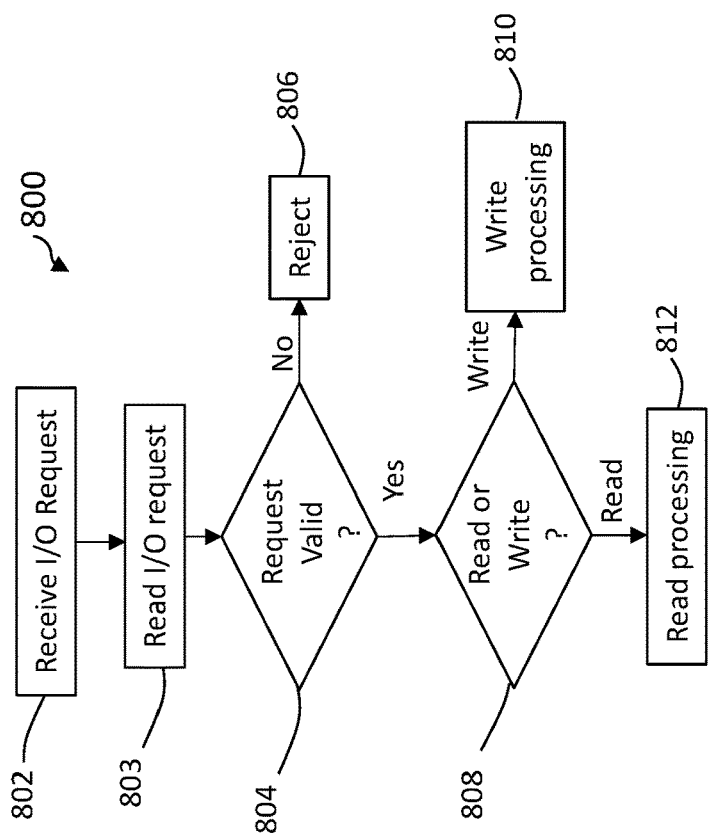
FIG. 8A is a flowchart illustrating an example of a method of processing an I/O request on a system in which a host system is directly connected to internal fabric of a storage system, according to embodiments of the invention.

FIG. 8A is a flowchart illustrating an example of a method 800 of processing an I/O request on a system in which a host system is directly connected to an internal fabric of a storage system, according to embodiments of the invention. Other embodiments of a method of processing an I/O request on a system in which a host system is directly connected to an internal fabric of a storage system, for example, variations of method 800, are possible and are intended to fall within the scope of the invention.

In step 802, an I/O request may be received, e.g., on an SSI (e.g., SSI 716) from an OS (e.g., 701) of a host system (e.g., host system 700). In embodiments in which NVMe is employed, the SSI may include an NVMe controller (e.g., NVMe controller 708) that receives an I/O communication in the form of a submission queue entry (SQE) from an SQ (e.g., SQ 704*a*) of an NVMe driver 702 of the OS. For example, the OS may place an SQE in the SQ for an I/O operation, and the NVMe driver may "ring the doorbell" in accordance with NVMe, i.e., may issue an interrupt to the NVMe controller on the SSI, or the NVMe controller may iteratively poll the SQ until an SQE is ready.

In step 803, the I/O request (e.g., specified in an SQE) may be read, for example, by the NVMe controller, and, in step 804, it may be determined whether the request is valid, for example, using I/O validation logic 711. For example, it may be determined whether the I/O communication is a valid NVMe communication and/or whether the I/O communication is authorized, for example, as described in more detail elsewhere herein. If it determined in step 804 that the I/O request is invalid, the I/O request may be rejected (e.g., dropped) in step 806.

If it is determined that the I/O request is valid, then it may be determined in step 808 whether the I/O request specifies a read or write operation. If it is determined in step 808 that the request specifies a write operation, then write processing may be performed in step 810. Write processing may include sending a write request over internal fabric 630 to one of directors 637 serving and as FA, and the FA may process the write operation, for example, using known techniques. Step 810 may be performed as described in relation to FIG. 9.

If it is determined in step 808 that the I/O request specifies a read operation, then read processing may be performed in step 812, for example, in accordance with method 812' described in relation to FIG. 8B.

FIG. 8B is a flowchart illustrating an example of a method 812' of processing a read operation, according to embodiments of the invention. Other embodiments of a method of processing a read operation, for example, variations of method 812', are possible and are intended to fall within the scope of the invention.

In step 814, metadata corresponding to the data specified in a read operation may be accessed. For example, the read operation may specify a logical storage device (e.g., a LUN or an NVMe namespace), and logical locations (e.g., one or more data portions and/or logical device tracks defining one or more logical address ranges) within the logical device. I/O processing logic 717 may access one or more of data structures 762, 772, 772', 782 and 750 of storage metadata 722 to obtain and/or determine metadata (e.g., one or more physical storage devices and physical address ranges therein) corresponding to the logical storage device and one or more logical locations. It may be determined that none of the data structures of storage metadata 722 have current information (or no information) about the specified logical storage device or the specified logical location(s) thereof, and step 814 may include sending read requests (e.g., RDMA read requests) directly to global memory (e.g., global memory 640) of the storage system for current information. Such requests may be configured as atomic operations.

In step 816, it may be determined whether the storage system (e.g., storage system 620*a*), or a component thereof pertinent to the data to be read (e.g., a LUN or namespace of the data) is currently in a complex state, for example, based on the metadata accessed in step 814. For example, it may be determined that one or more particular data services (e.g., replication, backup, offline data deduplication, etc.) are currently being performed on the LUN of the data. In some embodiments of the invention, if the state of the storage system is too complex, e.g., as a result of a particular data service currently being performed, it may be desirable to use a director to process the read operation, to utilize the processing power and metadata available to the director. If it is determined in step 816 that the storage system is in a complex state, then read processing may be performed using a director (e.g., one of directors 637) in step 818.

If it is determined in step 816 that the storage system is not in a complex state, then it may be determined in step 820 whether the data specified in the read request is in a cache (e.g., cache 642) of the storage system, for example, from the metadata accessed in step 814. If it is determined in step 820 that the specified data is in cache, then the data may be read directly from cache in step 822, for example, as described in more detail elsewhere herein.

If it is determined in step 820 that the specified data is not in cache, then the physical storage location of the data may be determined in step 824, for example, from the metadata accessed in step 814, and the specified data may be read from the physical storage device independent of any director on the storage system in step 826, for example, as described in more detail elsewhere herein.

Figure 9:
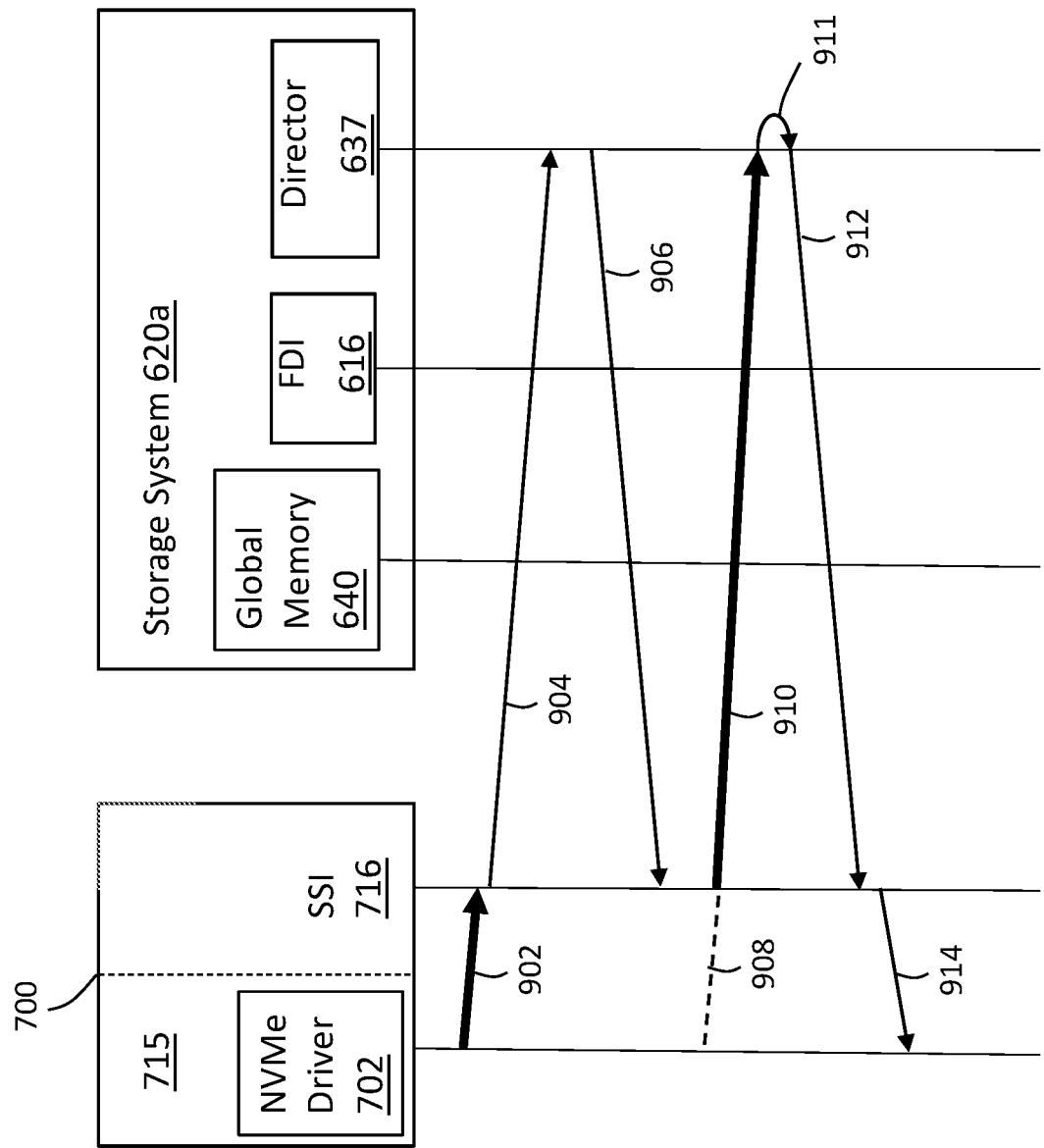
FIG. 9 is a timing diagram illustrating an example of a method of performing a write operation, according to embodiments of the invention.

FIG. 9 is a timing diagram illustrating an example of a method of performing a write operation, according to embodiments of the invention. Other embodiments of a method of performing a write operation, for example, variations of the method illustrated in FIG. 9, are possible and are intended to fall within the scope of the invention. The write operation may be performed as part of write processing 810. Each communication between SSI 716 and storage system 620a described in relation to FIG. 9, or in relation to FIGS. 10 and 11, may be transmitted over the internal fabric 630 of the storage system 620, for example, as an NVMf command capsule. In the embodiments illustrated in FIGS. 9-11, SSI 716 may be considered a first physical part of host system 700 and the remainder of the host system 700 may be considered a second physical part 715 of the host system.

After it has been determined that the I/O operation is a write operation, for example, as described above in relation to step 808, the data for the write operation may be transmitted from NVMe driver 702 to the SSI 716 in communication 902, e.g., over a peripheral device interconnect 703 (e.g., configured as a PCIe interconnect), and may be stored in memory 723. This movement of data may be considered a staging of the data in SSI 716 before the data is ultimately written to the storage system 620a. However, in some embodiments, this staging step may not be necessary, as the SSI 716 may be configured to control transmitting the data directly from the NVMe driver 702 to the storage system as part of performing communication 910 described in more detail below, as illustrated by dashed line 908. In such embodiments, communication 902 may not be performed.

Communication 904 may be a write command message sent from SSI 716 to director 637, for example, as an NVMf command capsule, specifying the write operation, which may include the logical storage device and one or more data portions and/or logic tracks representing one or more logical address ranges within the logical storage device. When the director 637 is ready to receive the data, it may send communication 906 back to the SSI 716 requesting that the data (i.e., the payload) of the write operation be transmitted to the director 637. For example, communication 906 may be an RDMA read request because it is a read operation from the perspective of the director, even though the overall operation being performed is a write operation. In response to receiving communication 906, SSI 716 may send communication 910 including the requested data. Communication 910 may be an RDMA communication. As should be appreciated, an RDMA (remote direct memory access) transfer does not require use of any CPU resident on SSI 716, thus preserving compute resources. In some embodiments in which the write data is not first staged in SSI 716, data may be sent from NVMe driver 702 to director 637 without first being staged in memory (e.g., memory 723) on SSI 716, as illustrated by dashed line 908.

The director 637 may perform processing 911 on the write operation, for example, in accordance with known techniques, and then send communication 912, for example, as an NVMf command capsule, acknowledging that the write operation is complete. SSI 716 (e.g., NVMe controller 708) may send communication 914, for example, as a completion queue entry (CQE) to NVMe driver 702, indicating that the write operation is complete, and one or more other communications (e.g., including a PCIe MSI-X interrupt) may be exchanged to complete the write transaction between NVMe driver 702 and SSI 716. NVMe driver 702 may process the CQE, and the completion of the write operation may be processed by other components of host system 700.

Figure 10:
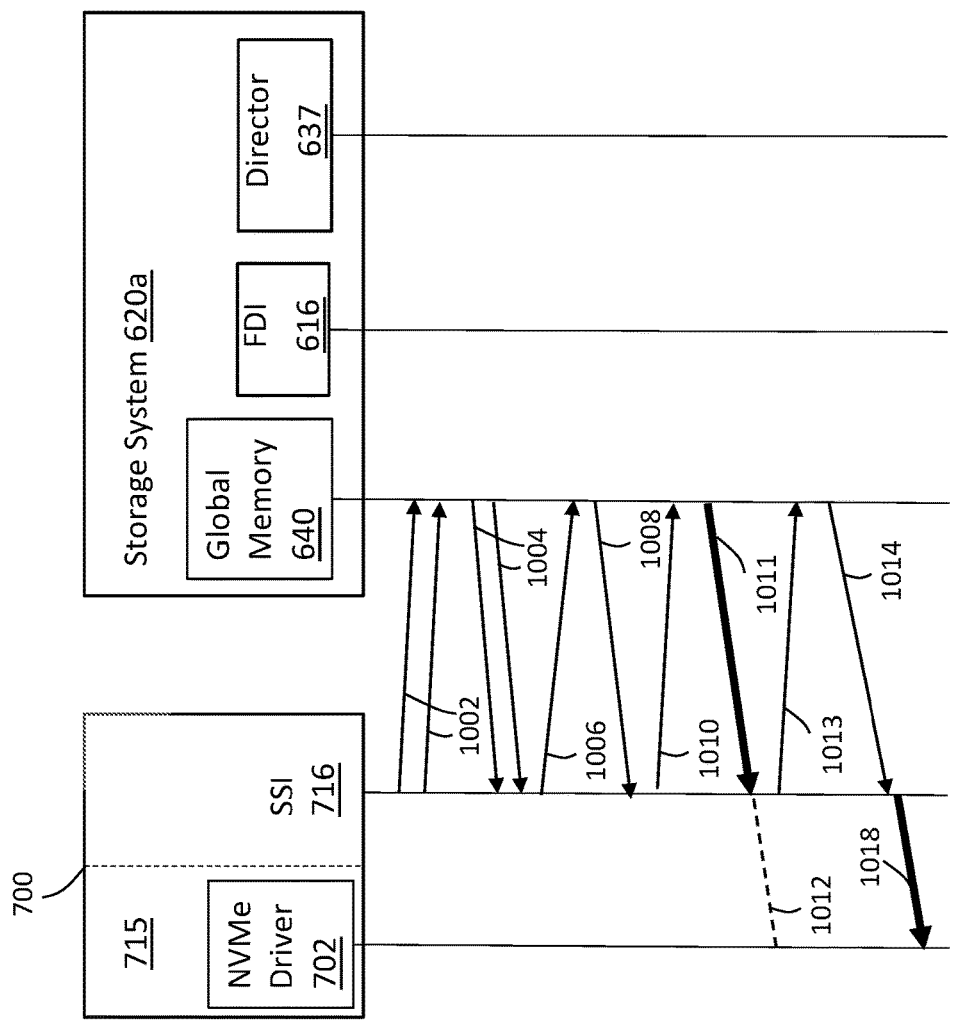
FIG. 10 is a timing diagram illustrating an example of a method of a host system reading data directly from a cache of a storage system, according to embodiments of the invention.

FIG. 10 is a timing diagram illustrating an example of a method of a host system 700 reading data directly from a cache of a storage system 620a, independent of any director compute resources, according to embodiments of the invention. Other embodiments of a method of a host system reading data directly from a cache of a storage system, for example, variations of the method illustrated in FIG. 10, are possible and are intended to fall within the scope of the invention.

As described elsewhere herein, after it has been determined that the I/O operation is a read operation, for example, as described above in relation to step 808, metadata corresponding to the data specified in a read operation may be accessed. For example, the read operation may specify a logical storage device (e.g., a LUN or an NVMe namespace), and one or more logical locations (e.g., data portions logical device tracks) within the logical device. I/O processing logic 717 may access one or more of data structures 762, 772, 772', 782 and 750 of storage metadata 722 to determine metadata (e.g., one or more physical storage devices and one or more physical address thereof) corresponding to the logical storage device and one or more logical locations specified in the read operation. It may be determined that one or more of the data structures of storage metadata 722 does not have current information (or no information) about the specified logical storage device and/or location. If such a determination is made, SSI 716 may send one or more read requests 1002 (e.g., RDMA read requests) directly to global memory 640 for current metadata concerning the data of the read operation. Such requests may be configured as atomic operations to lock the memory locations of the metadata (e.g., portions of 62, 72, 72', 82 and 500 associated with the data to be read). In some embodiments, to avoid the computational overhead and delay associated with performing a lock, communications 1002 are not performed as atomic operations. The current metadata may include any of a variety of metadata described in more detail elsewhere herein.

The current metadata corresponding to the read request may be sent in one or more responses 1004 from the global memory 640 to SSI 716. The I/O processing logic (e.g., the I/O path logic 720) of the SSI 716 may determine from the metadata (e.g., in performance of step 820) that the data for the read operation is in cache 642 (i.e., in one or more cache slots thereof), i.e., that there is a read cache hit. In response to the determination of a read cache hit, SSI 716 may send communication 1006 to cache 642 of global memory 640. Communication 1006 may be an atomic operation to lock the memory locations of the one or more cache slots identified in the metadata for the read operation, and obtain the cache-slot header(s) for the one or more cache slots. In some embodiments, to avoid the computational overhead and delay associated with performing a lock, communication 1006 is not performed as an atomic operation. In response, global memory 640 (e.g., cache 642) may send communication 1008 to SSI 716 including the contents (e.g., one or more timestamps reflecting when the current contents of the cache slot were populated and/or accessed as well as other metadata) of the one or more cache slot headers.

SSI 716 (e.g., I/O processing logic 717) may read the contents of communication 1008 and send read request 1010 for the data within the one or more cache slots, and global memory 640 may send the data 1011, for example, as an RDMA communication. In some embodiments, the sent data is not staged in memory of SSI 716 before being sent to NVMe driver 702, as indicated by dashed line 1012. In some embodiments, before sending the data read from cache to NVMe driver 702, SSI 716 may stage the data (e.g., in memory 723). Further, if communication 1006 was not an atomic operation that locked the cache slot, SSI 716 may send communication 1013 to global memory requesting the cache slot header(s) again, to ensure that the cache slot header information has not been changed (e.g., by a director 637) since communication 1008, which would mean that the cached data has changed.

In response to communication 1013, global memory may send communication 1014 to SSI 716 including the current contents of the one or more cache slot headers. SSI 716 then may compare the contents to the contents of the one or more cache slot headers received in step 1008. If the contents do not match, i.e., the cache slot header has changed, then the metadata may be re-read in communications 1002-1004. If it is determined that the data is still in cache, then communications 1006-1014 may be repeated. However, if the metadata reveals that the data is no longer in cache, e.g., it has been evicted in accordance with cache policy, then the data may be read from one or more physical storage devices, for example, by performing action 1105-1116 described in relation to FIG. 11. Re-checking the cache slot header has minimal overhead in comparison to performing an atomic operation. Thus, as long as it is not too frequent that the contents of the one or more cache slot headers change between communication 1008 and 1013, thereby requiring a re-read of the data from cache or one or more physical storage devices, performing non-atomic read operations (i.e., "lockless reads" may be desirable from a performance perspective.

If it is determined (e.g., by I/O processing logic 717) that the contents of the one or more cache slot headers has not changed since communication 1008; i.e., if the cache slot contents are validated, then a communication 1018 including the data for the read operation, read from the one or more cache slots, may be sent from SSI 716 (e.g., from NVMe controller 708) to NVMe driver 702 in accordance with NVMe as described in detail elsewhere herein. One or more other communications may be exchanged to complete the read transaction between NVMe driver 702 and SSI 716. NVMe controller 702, and other components of host system 700 in-turn may process the read data.

Each of communications 1006, 1008, 1010, 1011, 1012, 1013, 1014, 1018, 1020 and 1022 may be performed as part of performance of various embodiments of step 822 of method 800.

As described in more detail elsewhere herein, for read cache hits in known systems, data may be read along an I/O path including the host system, an external network, director compute resources, a global memory, and perhaps an internal fabric. In contrast, in embodiments of the invention, for example, as described in relation to FIG. 10, for read cache hits, data may be read along an I/O path including the host system, an internal fabric and a global memory. That is, the external network and director compute resources may not be used, which may produce reduced response times for read cache hits.

Figure 11:
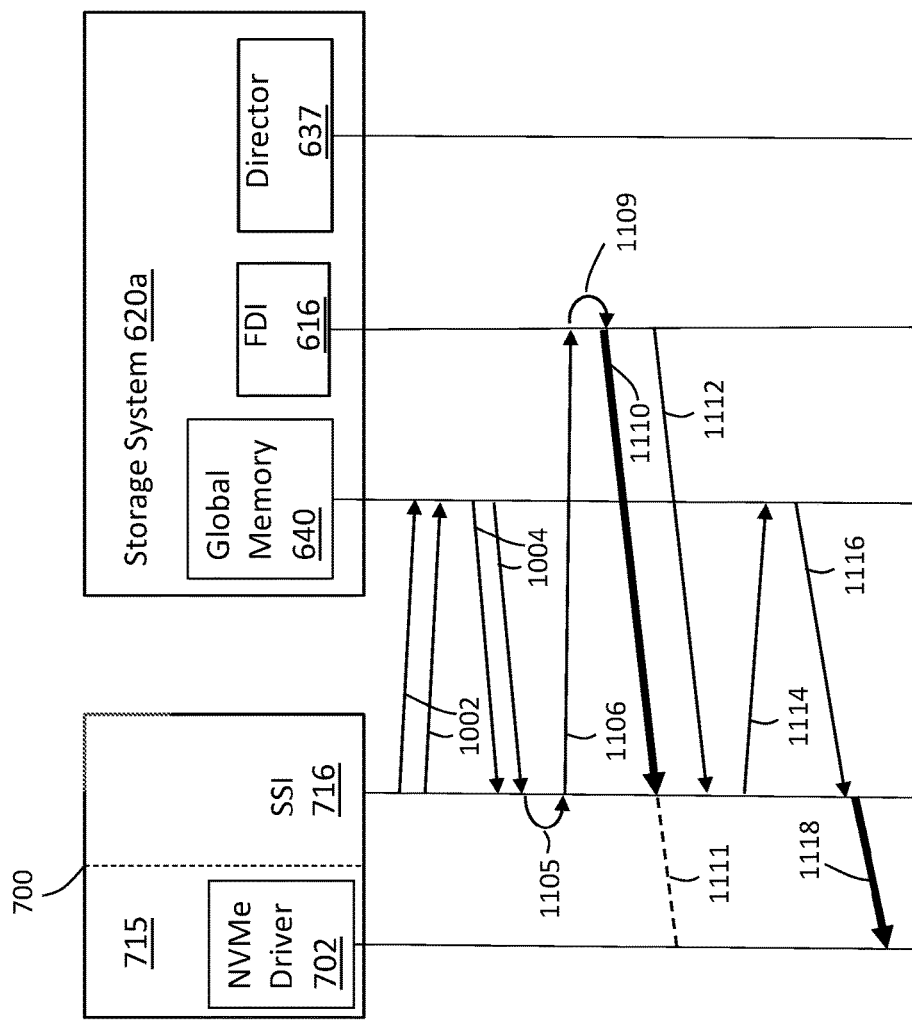
FIG. 11 is a timing diagram illustrating an example of a host system reading data from a physical storage device of a storage system independent of any director, according to embodiments of the invention.

FIG. 11 is a timing diagram illustrating an example of a host system 700 reading data from a physical storage device of a storage system 620*a* independent of any director 637, according to embodiments of the invention. Other embodiments of a method of a host system reading data directly from a physical storage device of a storage system 620*a*, for example, variations of the method illustrated in FIG. 11, are possible and are intended to fall within the scope of the invention.

As described elsewhere herein, after it has been determined that the I/O operation is a read operation, for example, as described above in relation to step 808, metadata corresponding to the data specified in a read operation may be accessed. For example, the read operation may specify a logical storage device (e.g., a LUN or an NVMe namespace), and one or more logical locations (e.g., data portions logical device tracks) within the logical device. I/O processing logic 717 may access one or more of data structures 762, 772, 772', 782 and 750 of storage metadata 722 to determine metadata (e.g., one or more physical storage devices and one or more physical address thereof) corresponding to the logical storage device and one or more logical locations specified in the read operation. It may be determined that one or more of the data structures of storage metadata 722 does not have current information (or no information) about the specified logical storage device and/or location. If such a determination is made, SSI 716 may send one or more read requests 1002 (e.g., RDMA read requests) directly to global memory 640 for current metadata concerning the data of the read operation. Such requests may be configured as atomic operations to lock the memory locations of the metadata (e.g., portions of 62, 72, 72', 82 and 500 associated with the data to be read). In some embodiments, to avoid the computational overhead and delay associated with performing a lock, communications 1002 are not performed as atomic operations. The current metadata may include any of a variety of metadata described in more detail elsewhere herein.

The current metadata corresponding to the read request may be sent in one or more responses 1004 from the global memory 640 to SSI 716. The I/O processing logic (e.g., the I/O path logic 720) of the SSI 716 may determine from the metadata (e.g., in performance of step 820) that the data for the read operation is not in cache 642 (i.e., not in one or more cache slots thereof), i.e., that there is a read cache miss. In response to the determination of a read cache miss, SSI 716 (e.g., device mapping logic 718) may perform processing 1105 to determine the one or more physical storage devices and physical address ranges therein corresponding to the logical storage device and one or more logical locations specified in the read operation. For example, the read operation may specify a logical storage device ID and one or more data portion IDs and/or logical track IDs of data portion(s) and/or logical track(s), respectively, within the logical storage device. Device mapping logic 718 may access the corresponding entries in master device table 762, logical device table 772, thin device table 772' and/or track table 782 to determine the one or more physical storage devices and physical address ranges therein corresponding to the logical storage device ID and one or more data portion IDs and/or logical track IDs.

After determining the one or more physical storage devices and one or more physical address ranges thereof, SSI 716 may send one or more communications 1106 to FDI 606. Each of one or more communications 1006 may be a read command message (e.g., an NVMf command capsule) specifying the one or more determined physical storage devices and physical address range(s) therein. FDI 606 may perform processing 1109 to read the read command message and retrieve the data from the specified one or more determined physical storage devices and physical address range(s). FDI 606 may send one or more communications 1110 including the retrieved data, for example, an RDMA write operation (albeit the overall operation is a read operation) encapsulated within an NVMf command capsule. SSI 716 may stage the received data (e.g., in memory 723) before sending the data to NVMe driver 702, or, in some embodiments, not stage the read data in memory of SSI 716 and send it to NVMe driver 702, as indicated by dashed line 1111.

In some embodiments, if communications 1002 were not atomic operations that locked memory locations of the metadata corresponding to the read data, SSI 716 may send communication 1114 to global memory requesting the metadata again, or at least a portion of the metadata, for example, one or more track table entries corresponding to the read data, to ensure such metadata has not changed (e.g., by a director 637) since communications 1004, which may have happened if communications 1002 were not atomic operations that locked the memory locations of the data structures holding the metadata.

In response to communication 1114, global memory may send communication 1116 to SSI 716 including the current contents of the one or more metadata structures (or portions thereof) requested. SSI 716 may compare the current contents to contents received in communication 1004. If the contents do not match, i.e., the metadata has changed, then, if communications 1114-1116 involved retrieving all the same metadata as communications 1002 and 1004, then such metadata may be used to determine whether the data is now in cache. If communications 1114-1116 did not retrieve all the same metadata as communications 1002 and 100, then communications 1002-1116 may be repeated and the retrieved metadata used to determine whether the data is now in cache. If it is determined that the data is still now in cache, then communications 1006-1014 described in relation to FIG. 10 may be repeated. However, if the metadata reveals that the data is still not in cache, then actions 1105-1116 may be repeated. Re-checking the metadata has minimal overhead in comparison to performing an atomic operation. Thus, as long as it is not too frequent that the contents of the relevant metadata changes between communication 1004 and 1114, thereby requiring a re-read of the data from cache or one or more physical storage devices, performing non-atomic read operations (i.e., "lockless reads" may be desirable from a performance perspective.

If it is determined (e.g., by I/O processing logic 717) that the contents of the metadata has not changed since communication 1004; i.e., if the metadata is validated, then a communication 1118 including the data for the read operation, read from one or more physical storage devices, may be sent from SSI 716 (e.g., from NVMe controller 708) to NVMe driver 702 in accordance with NVMe as described in detail elsewhere herein. One or more other communications may be exchanged to complete the read transaction between NVMe driver 702 and SSI 716. NVMe controller 702, and other components of host system 700 in-turn may process the read data.

Each of actions 1105, 1106, 1110, 1111, 1114, 1018, 1116, 1118, 1120 and 1122 may be performed as part of performance of various embodiments of steps 824 and 826, collectively, of method 800.

As described in more detail elsewhere herein, for read cache misses in known systems, data may be read along an I/O path including the host system, an external network, an FA (director), a global memory, an internal fabric, a BE (director) and physical storage device. In contrast, in embodiments of the invention, for example, as described in relation to FIG. 11, for read cache misses, data may be read along an I/O path including the host system, an internal fabric, an FDI and a physical storage device. That is, the external network and multiple directors may not be used, which may produce reduced response times for read cache misses.

As described above, in some embodiments, it may be determined in step 816 that a state of the storage system is complex, such that a director (e.g., one of directors 637) may perform read processing. In such embodiments, SSI 716 may exchange NVMf communications with a director, and the read data may be transmitted from the director to the SSI 716, for example, as an RDMA communication, and then to operating system 701, for example, to the NVMe driver 702 in accordance with NVMe.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 800 and the methods described in relation to FIGS. 9-11, or parts thereof, may be implemented using one or more of the systems and/or data structures described in relation to FIGS. 1-7, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:
1. A storage network comprising:
a storage system including:
a plurality of physical storage devices on which data is stored, one or more directors that process I/O operations for the data stored on the plurality of physical storage devices, each of the one or more directors including one or more processing cores,
a memory including a cache for processing I/O operations, and
an internal switching fabric, internal to the storage system, that interconnects the one or more directors and the cache;
a host system having one or more applications running thereon, the execution of which results in I/O operations involving the data stored on the plurality of physical storage devices; and
an external network that is external to the storage system that interconnects the host system to one or more other components of the storage network,
wherein the host system is connected to the internal switching fabric of the storage system independently of the external network,
wherein the host system is connected to the internal switching fabric of the storage system without any of the one or more directors being connected between the host system and the internal switching fabric,
wherein the host system accesses the internal switching fabric of the storage system independent of control by any of the one or more directors or other components of the storage system, and
wherein the host system accesses the cache directly over the internal switching fabric using remote direct memory access communications.

2. The system of claim 1, wherein the one or more physical storage devices are communicatively coupled to the switch fabric along at least one communication path that does not include any of the one or more directors.

3. The system of claim 1, wherein the host system is communicatively coupled to the one or more physical storage devices along a communication path that includes the internal switching fabric and that does not include any of the one or more directors.

4. The system of claim 1, wherein the storage system further includes an interface component coupled between the internal switching fabric and the plurality of physical storage devices.

5. The system of claim 1, wherein the host system further comprises:
one or more data structures containing metadata for data stored on the storage system, the metadata including information indicating whether first data is currently stored in cache on the storage system; and
I/O logic to determine by accessing the one or more data structures whether to access the first data from the cache or from one or more of the plurality of storage devices.

6. For a system including a host system having one or more applications running thereon and a storage system, the storage having a plurality of physical storage devices on which data is stored, one or more directors that process I/O operations involving the data stored on the plurality of physical storage devices, each of the one or more directors including one or more processing cores, a memory including a cache for processing I/O operations, and an internal switching fabric, internal to the storage system, that interconnects the one or more directors and the cache, a method comprising:
receiving on the host system an I/O request from a first of the one or more applications running thereon, the I/O request specifying a portion of data corresponding to a first of the plurality of physical storage devices; and
processing the I/O request, including the host system initiating an I/O communication from the host system to the internal switching fabric of the storage system without using any of the one or more directors,
wherein the host system accesses the internal switching fabric of the storage system independent of control by any of the one or more directors or other components of the storage system,
wherein the system further includes an external network that is external to the storage system that interconnects the host system to one or more other components of the storage network,
wherein the host system is connected to the internal switching fabric of the storage system independently of the external network, and
wherein the host system accesses the cache directly over the internal switching fabric using remote direct memory access communications.

7. The method of claim 6, further comprising:
the host system communicating with the one or more physical storage devices along a communication path that includes the internal switching fabric and that does not include any of the one or more directors.

8. The method of claim 7, wherein the communication path includes an interface component of the storage system, the interface component coupled between the internal switching fabric and the plurality of physical storage devices.

9. The method of claim 6, wherein the host system further includes one or more data structures containing metadata for data stored on the storage system, the metadata including information indicating whether first data is currently stored in cache on the storage system, and wherein the method further comprises:
the host system accessing the one or more data structures to determine whether to access the first data from the cache or from one or more of the plurality of storage devices.

10. For a system including a host system having one or more applications running thereon and a storage system, the storage having a plurality of physical storage devices on which data is stored, one or more directors that process I/O operations involving the data stored on the plurality of physical storage devices, each of the one or more directors including one or more processing cores, a memory including a cache for processing I/O operations, and an internal switching fabric, internal to the storage system, that interconnects the one or more directors and the cache, one or more non-transitory computer-readable media, the non-transitory computer-readable media having software stored thereon comprising:
executable code that receives on the host system an I/O request from a first of the one or more applications running thereon, the I/O request specifying a portion of data corresponding to a first of the plurality of physical storage devices; and
executable code that processes the I/O request, including the host system initiating an I/O communication from the host system to the internal switching fabric of the storage system without using any of the one or more directors,
wherein the host system accesses the internal switching fabric of the storage system independent of control by any of the one or more directors or other components of the storage system, wherein the system further includes an external network that is external to the storage system that interconnects the host system to one or more other components of the storage network, wherein the host system is connected to the internal switching fabric of the storage system independently of the external network, and wherein the host system accesses the cache directly over the internal switching fabric using remote direct memory access communications.

11. The one or more non-transitory computer-readable media of claim 10, wherein the one or more physical storage devices are communicatively coupled to the switch fabric along at least one communication path that does not include any of the one or more directors.

12. The one or more non-transitory computer-readable media of claim 11, wherein the software further comprises:

executable code that controls the host system to communicate with the one or more physical storage devices along a communication path that includes the internal switching fabric and that does not include any of the one or more directors.

13. The one or more non-transitory computer-readable media of claim 12, wherein the communication path includes an interface component of the storage system, the interface component coupled between the internal switching fabric and the plurality of physical storage devices.

14. The one or more non-transitory computer-readable media of claim 10, wherein the host system further includes one or more data structures containing metadata for data stored on the storage system, the metadata including information indicating whether first data is currently stored in cache on the storage system, and wherein the software further comprises:

executable code that controls the host system to access the one or more data structures to determine whether to access the first data from the cache or from one or more of the plurality of storage devices.

* * * * *